(12) United States Patent
Miyazaki et al.

(10) Patent No.: US 12,275,273 B2
(45) Date of Patent: Apr. 15, 2025

(54) RAISED WOODGRAIN FINISH DECORATIVE MATERIAL

(71) Applicant: Dai Nippon Printing Co., Ltd., Tokyo (JP)

(72) Inventors: Saori Miyazaki, Shinjuku-ku (JP); Masanori Ueno, Fujimi (JP); Hironobu Nishimura, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 18/233,413

(22) Filed: Aug. 14, 2023

(65) Prior Publication Data

US 2023/0382156 A1   Nov. 30, 2023

Related U.S. Application Data

(62) Division of application No. 17/041,070, filed as application No. PCT/JP2019/014131 on Mar. 29, 2019, now Pat. No. 11,772,415.

(30) Foreign Application Priority Data

| Mar. 30, 2018 | (JP) | 2018-067638 |
| Sep. 11, 2018 | (JP) | 2018-169716 |
| Sep. 28, 2018 | (JP) | 2018-186065 |

(51) Int. Cl.
*B44F 9/02* (2006.01)
*B32B 3/30* (2006.01)
(Continued)

(52) U.S. Cl.
CPC ............ *B44F 9/02* (2013.01); *B32B 3/30* (2013.01); *B44C 3/025* (2013.01); *B44C 5/043* (2013.01);
(Continued)

(58) Field of Classification Search
CPC ......... B44F 9/02; B32B 3/30; B32B 2451/00; Y10T 428/24438; B27M 1/02;
(Continued)

(56) References Cited

U.S. PATENT DOCUMENTS

| 3,452,861 A | 7/1969 | Erwin |
| 2006/0144004 A1 | 7/2006 | Nollet et al. |

(Continued)

FOREIGN PATENT DOCUMENTS

| BE | 1021539 B1 | 12/2015 |
| CN | 202220419 U | 5/2012 |

(Continued)

OTHER PUBLICATIONS

Translation of JP2007050644A. (Year: 2007).*

(Continued)

*Primary Examiner* — Catherine A. Simone
(74) *Attorney, Agent, or Firm* — Troutman Pepper Locke LLP

(57) ABSTRACT

Provided is an inexpensive raised woodgrain finish decorative material that exhibits design properties similar to those of actual wood by the effect of reproducing visual appearance and feeling and has a short production timeline. The raised woodgrain finish decorative material has a substrate, a first raised section provided on one surface of the substrate, and a second raised section provided on the one surface of the substrate in a different location than the location of the first raised section, wherein the length of the first raised section is longer than the length of the second raised section in the lengthwise direction of the substrate, and the height of the first raised section is higher than the height of the second raised section in the thickness direction of the substrate.

17 Claims, 7 Drawing Sheets

(51) Int. Cl.
  *B44C 3/02* (2006.01)
  *B44C 5/04* (2006.01)
(52) U.S. Cl.
  CPC ....... *B32B 2255/10* (2013.01); *B32B 2451/00* (2013.01); *Y10T 428/24438* (2015.01); *Y10T 428/24479* (2015.01)
(58) Field of Classification Search
  CPC .......... B27M 1/003; B27M 1/04; B27M 1/06; B44C 5/04
  See application file for complete search history.

(56) References Cited

U.S. PATENT DOCUMENTS

| | | |
|---|---|---|
| 2008/0213616 A1 | 9/2008 | Luetgert et al. |
| 2009/0252925 A1 | 10/2009 | Provoost et al. |
| 2010/0092731 A1 | 4/2010 | Pervan et al. |

FOREIGN PATENT DOCUMENTS

| | | |
|---|---|---|
| JP | S49-025323 B1 | 6/1974 |
| JP | S50-18022 A | 2/1975 |
| JP | S51-590 A | 1/1976 |
| JP | S56-5785 A | 1/1981 |
| JP | S60-64885 A | 4/1985 |
| JP | S60-64886 A | 4/1985 |
| JP | H04-140750 A | 5/1992 |
| JP | H04-238032 A | 8/1992 |
| JP | H05-4310 A | 1/1993 |
| JP | H11-147399 A | 6/1999 |
| JP | H11-263100 A | 9/1999 |
| JP | 2000-006598 A | 1/2000 |
| JP | 2000-008538 A | 1/2000 |
| JP | 2000-033799 A | 2/2000 |
| JP | 2002-211200 A | 7/2002 |
| JP | 2004-050736 A | 2/2004 |
| JP | 2007-050644 A | 3/2007 |
| JP | 2009-297895 A | 12/2009 |
| JP | 2010-071004 A | 4/2010 |
| JP | 2014-189014 A | 10/2014 |
| JP | 2014-195914 A | 10/2014 |
| JP | 2014-201008 A | 10/2014 |
| JP | 2016-069800 A | 5/2016 |
| JP | 2016-203639 A | 12/2016 |
| JP | 2018-008512 A | 1/2018 |
| WO | 2006/066776 A2 | 6/2006 |
| WO | 2007/072198 A2 | 6/2007 |

OTHER PUBLICATIONS

International Search Report mailed Jun. 18, 2019, issued for PCT/JP2019/014131.

Supplementary European Search Report mailed Nov. 8, 2021, issued for European Patent Application No. 19777816.0.

Official communication mailed Dec. 20, 2023, issued in KR application No. 10-2020-7030978 and English translation thereof.

Official communication dated Aug. 19, 2024, issued in KR application 10-2020-7030978 and English translation thereof.

* cited by examiner

RAISED WOODGRAIN FINISH DECORATIVE MATERIAL

FIELD OF THE INVENTION

The present invention relates to a decorative material, especially a raised woodgrain finish decorative material.

BACKGROUND OF THE INVENTION

Processed products of natural wood are variously used for building materials, fittings, fixture members and furniture. However, good natural wood resources are limited, and decorative materials for imparting woodgrain finish design properties to the surfaces of building materials or furniture materials may be used in place of such resources so as not to be depleted. Woodgrain finish decorative materials are given annual growth rings by a springwood (early wood) part and an autumn wood (late wood) part for achieving an effect of reproducing visual appearance similar to that of actual wood. Such an annual ring pattern is so configured that, for the purpose of enhancing the design appearance and feel thereof, the springwood part thereof is expressed by gravure printing while the autumn wood part is by gravure printing, relief printing or silkscreen printing, as a raised woodgrain finish decorative material (prepared by a so-called treatment of scrubbing wood to give it texture) in which the other part than the part for the autumn wood material of the annual rings is raised over the part for the autumn wood material part therein by polishing the wood material surface, and the annual ring pattern of the type has been proposed (e.g., see PTL 1).

However, in the woodgrain finish decorative material proposed in PTL 1, in particular, the effect of reproducing raised visual design appearance and feeling is insufficient, and especially the feeling is insufficient, and therefore the decorative material proposed therein could not be said to have design properties similar to those of actual wood.

Given the situation, another woodgrain finish decorative material has been proposed, in which a springwood part is printed by gravure printing on a resin substrate, and a raised section of mainly an autumn wood part is formed by an embossing plate prepared by making a cast from a raised surface of a natural wood plate followed by electrocasting with the resultant cast (e.g., see PTL 2).

CITATION LIST

Patent Literature

PTL 1: JP 49-25323 B
PTL 2: JP 5-4310 B

SUMMARY OF INVENTION

Technical Problem

The raised profile of a woodgrain finish decorative material produced with an embossing plate formed by electrocasting is faithful to the original, and has design properties similar to those of actual wood. However, production of an embossing plate by electrocasting first requires a rare natural wood plate having good design appearance and feeling and, in addition thereto, further requires a long production timeline and is expensive and, as a result, there occur problems that the production timeline for decorative materials is prolonged and the resultant decorative materials are expensive.

In consideration of the above-mentioned problems, an object of the present invention is to provide an inexpensive raised woodgrain finish decorative material that has a short production timeline and exhibits design properties similar to those of actual wood by the effect of reproducing visual appearance and feeling.

Solution to Problem

For solving the above-mentioned problems, the present inventors have assiduously studied and, as a result, have found that the problems can be solved by providing a specific raised section on one surface of a substrate, or by providing a specific raised section and a slope section. Specifically, the present invention provides the following [1] to [27].

[1] A raised woodgrain finish decorative material having a substrate, a first raised section provided on one surface of the substrate, and a second raised section provided on the one surface of the substrate in a different location than the location of the first raised section, wherein the length of the first raised section is longer than the length of the second raised section in the lengthwise direction of the substrate, and the height of the first raised section is higher than the height of the second raised section in the thickness direction of the substrate.

[2] The raised woodgrain finish decorative material according to [1], wherein the height of the first raised section is 0.1 mm or more and 0.17 mm or less from the bottom of the first raised section and the second raised section.

[3] The raised woodgrain finish decorative material according to [1] or [2], wherein the width of the first raised section is 0.3 mm or more and 2.0 mm or less in the direction perpendicular to the lengthwise direction of the substrate.

[4] The raised woodgrain finish decorative material according to any of [1] to [3], wherein the distance between the first raised sections in the direction perpendicular to the thickness direction of the substrate is 0.1 mm or more and 5.4 mm or less.

[5] The raised woodgrain finish decorative material according to any of [1] to [4], wherein the end of the first raised section exists only at the edge of the substrate.

[6] The raised woodgrain finish decorative material according to any of [1] to [5], wherein the length of the second raised section is 0.3 mm or more and 300 mm or less in the lengthwise direction of the substrate.

[7] The raised woodgrain finish decorative material according to any of [1] to [6], wherein the height of the second raised section is 0.03 mm or more and 0.09 mm or less from the bottom of the first raised section and the second raised section.

[8] The raised woodgrain finish decorative material according to any of [1] to [7], wherein the width of the second raised section is 0.06 mm or more and 0.9 mm or less in the direction perpendicular to the lengthwise direction of the substrate.

[9] The raised woodgrain finish decorative material according to any of [1] to [8], wherein the proportion of the second raised section to the proportion of the first raised section in the substrate surface is 0.5 or more and 2.0 or less.

[10] The raised woodgrain finish decorative material according to any of [1] to [9], wherein the proportion of the second raised section to the residual part of the first raised section in the substrate surface is 0.1 or more and 0.8 or less.

[11] A raised woodgrain finish decorative material having a substrate, a first raised section provided on one surface of the substrate, a slope section provided on the one surface of the substrate in a different location than the location of the first raised section in a planar view, and a second raised section provided on the one surface of the substrate in at least any of a different location than the location of the first raised section and a location of the slope section, wherein the height of the first raised section is the same as or higher than the height of the top of the slope section in the thickness direction of the substrate, and the height of the first raised section is higher than the height of the second raised section in the thickness direction of the substrate.

[12] The raised woodgrain finish decorative material according to [11], wherein the inclination angle of the slope section is 3 degrees or more and 70 degrees or less based on the substrate surface on which the slope section is provided.

[13] The raised woodgrain finish decorative material according to [11] or [12], wherein the slope section extends from the neighboring one first raised section to the neighboring other first raised section.

[14] The raised woodgrain finish decorative material according to any of [11] to [13], wherein the height of the first raised section is 0.050 mm or more and 0.500 mm or less from the substrate surface.

[15] The raised woodgrain finish decorative material according to any of [11] to [14], wherein the width of the first raised section is 0.20 mm or more and 5.00 mm or less in the direction perpendicular to the lengthwise direction of the substrate.

[16] The raised woodgrain finish decorative material according to any of [11] to [15], wherein the distance between the first raised sections in the direction perpendicular to the lengthwise direction of the substrate is 0.20 mm or more and 30.00 or less.

[17] The raised woodgrain finish decorative material according to any of [11] to [16], wherein the end of the first raised section exists only at the edge of the substrate.

[18] The raised woodgrain finish decorative material according to any of [11] to [17], wherein the length of first raised section is longer than that of the second raised section in the lengthwise direction of the substrate.

[19] The raised woodgrain finish decorative material according to any of [11] to [18], wherein the length of the second raised section is 0.30 mm or more and 300.00 mm or less in the lengthwise direction of the substrate.

[20] The raised woodgrain finish decorative material according to any of [11] to [19], wherein the height of the second raised section is 0.02 mm or more and 0.10 mm or less from the substrate surface or the slope section surface.

[21] The raised woodgrain finish decorative material according to any of [11] to [20], wherein the width of the second raised section is 0.06 mm or more and 0.90 mm or less in the direction perpendicular to the lengthwise direction of the substrate.

[22] The raised woodgrain finish decorative material according to any of [11] to [21], wherein the proportion of the second raised section to the proportion of the first raised section in the substrate surface is 0.50 or more and 4.00 or less.

[23] The raised woodgrain finish decorative material according to any of [11] to [22], wherein the proportion of the second raised section to the residual part of the first raised section in the substrate surface is 0.10 or more and 3.00 or less.

[24] The raised woodgrain finish decorative material according to any of [1] to [23], wherein the end of the second raised section in the lengthwise direction of the substrate has a narrowed and roundish form.

[25] The raised woodgrain finish decorative material according to any of [1] to [24], wherein the second raised sections are aligned in series and at intervals in the lengthwise direction of the substrate.

[26] The raised woodgrain finish decorative material according to any of [1] to [25], further having a pattern layer on the surface of at least one side of the substrate.

[27] The raised woodgrain finish decorative material according to any of [1] to [26], further having a lining substrate on the opposite side surface to the surface on which the first raised section, the second raised section and the slope section are provided.

Advantageous Effects of Invention

According to the present invention, there can be provided an inexpensive raised woodgrain finish decorative material that has design properties similar to those of actual wood by the effect of reproducing visual appearance and feeling and has a short production timeline.

BRIEF DESCRIPTION OF DRAWINGS

FIG. 8(a) is a schematic perspective view of a raised woodgrain finish decorative material of a second embodiment of the present invention; FIG. 8(b) is a schematic cross-sectional view of a raised woodgrain finish decorative material of a second embodiment of the present invention;

DESCRIPTION OF EMBODIMENTS

Hereinunder embodiments of the present invention are described with reference to drawings. In the description of the drawings given hereinunder, the same or similar parts are expressed by the same or similar reference signs. However, the drawings are schematic ones, in which, therefore, the relationship between the thickness and the planar dimension, and the ratio of the thickness of each layer differ from actual ones. Accordingly, concrete thickness and dimension should be judged in the light of the following description.

Needless-to-say, each drawing may contain parts that differ in the relation and the ratio of mutual dimensions.

EMBODIMENTS OF INVENTION

The raised woodgrain finish decorative material of embodiments of the present invention has a substrate and a first raised section provided on one surface of the substrate, and satisfies the following requirement 1 or requirement 2.

Requirement 1: The raised woodgrain finish decorative material has a second raised section provided on the one surface of the substrate in a different location than the location of the first raised section, wherein the length of the first raised section is longer than the length of the second raised section in the lengthwise direction of the substrate, and the height of the first raised section is higher than the height of the second raised section in the thickness direction of the substrate.

Requirement 2: The raised woodgrain finish decorative material has a slope section provided on the one surface of the substrate in a different location than the location of the first raised section in a planar view, and a second raised section provided on the one surface of the substrate in at least any of a different location than the location of the first raised section and a location of the slope section, wherein the height of the first raised section is the same as or higher than the height of the top of the slope section in the thickness direction of the substrate, and the height of the first raised section is higher than the height of the second raised section in the thickness direction of the substrate.

The details of the requirement 1 are described below as a first embodiment. The details of the requirement 2 are described below as a second embodiment.

First Embodiment

[Raised Woodgrain Finish Decorative Material]

Figure 1:
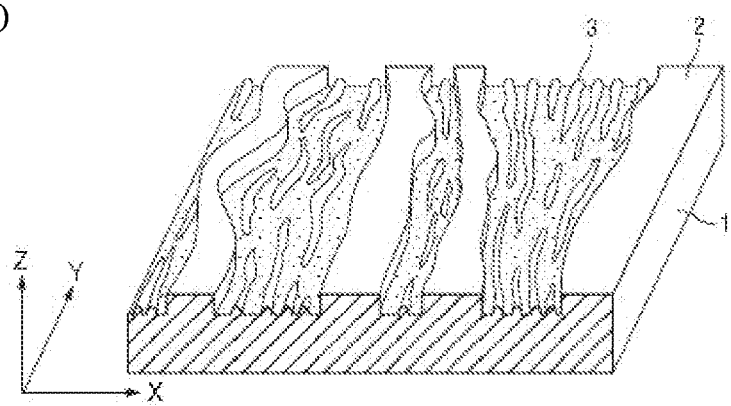
FIG. 1(a) is a schematic perspective view of a raised woodgrain finish decorative material of a first embodiment of the present invention.
FIG. 1(b) is a schematic cross-sectional view of a raised woodgrain finish decorative material of a first embodiment of the present invention.
FIG. 1(c) is a schematic plan view of a raised woodgrain finish decorative material of a first embodiment of the present invention.
Figure 1:
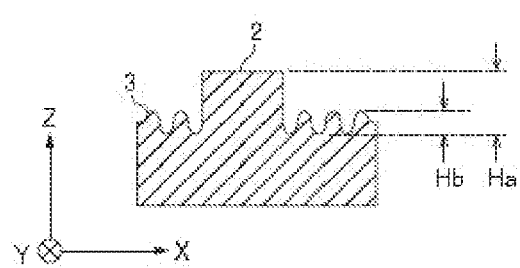
Figure 1:
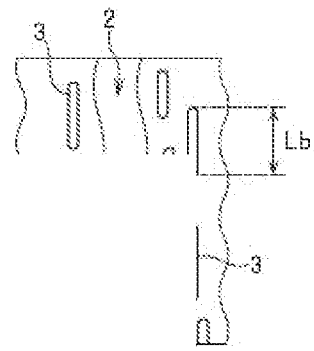

The raised woodgrain finish decorative material of a first embodiment of the present invention has, as shown in FIGS. 1(*a*)-(*c*), a substrate 1, a first raised section 2 provided on one surface of the substrate 1 (in FIGS. 1(*a*)-(*c*), the upper side of the raised woodgrain finish decorative material, that is, the surface on the side of the +Z direction), and a second raised section 3 provided on the one surface of the substrate 1 in a different location than the location of the first raised section 2 in a planar view (in FIGS. 1(*a*)-(*c*), an appearance toward the −Z direction from the side of the +Z direction). The length of the first raised section 2 is longer than the length of the second raised section 3 in the lengthwise direction of the substrate 1 (in FIGS. 1(*a*)-(*c*), in the Y direction). The height of the first raised section 2 is higher than the height of the second raised section 3 in the thickness direction of the substrate 1 (in FIGS. 1(*a*)-(*c*), in the Z direction).

Figure 7:
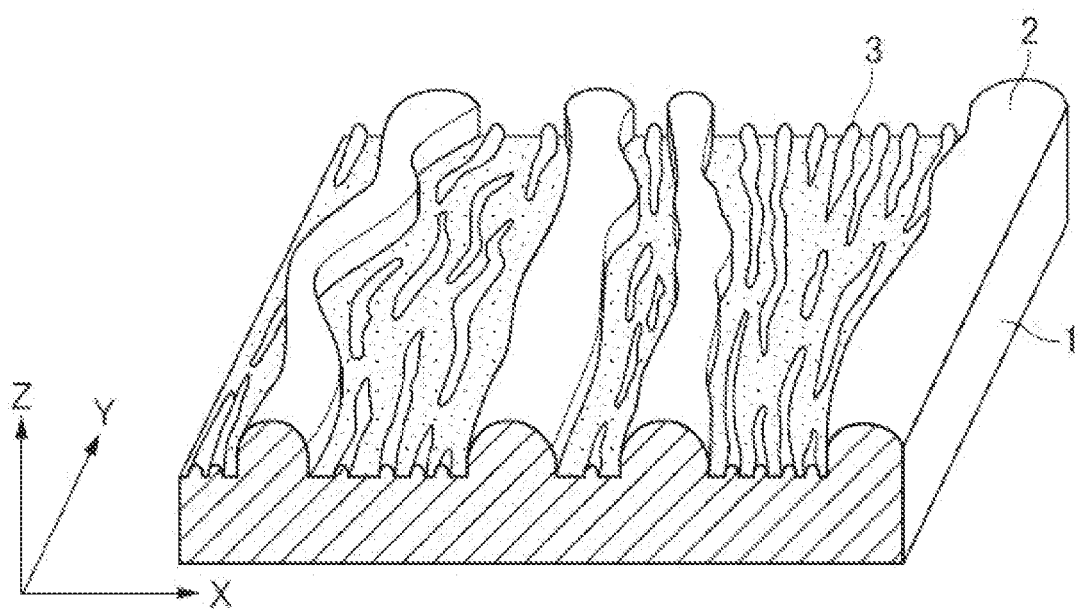
FIG. 7 is a schematic perspective view of a raised woodgrain finish decorative material of a first embodiment of the present invention.

In the embodiment shown in FIGS. 1(*a*)-(*c*), the surface on one side of the first raised section 2 is flat, but in the present invention, the surface on one side of the first raised section 2 can be curved, as shown in FIG. 7.

The raised woodgrain finish decorative material includes, though not specifically limited thereto, Japanese cedar, Japanese cypress, walnut tree, pine and cherry, as a wood material intended to reproduce the design thereof.

<Substrate>

The form of the substrate 1 may be any of a sheet, a film or a plate.

Not specifically limited, the substrate 1 may be any general one usable for decorative materials, and may be selected from resin substrates, metal substrates, ceramic substrates, fibrous substrates and woody substrates in accordance with the intended use thereof. One alone of these substrates may be used, or the substrate may also be in the form of a laminate of a composite in any combination of a resin substrate and a metal substrate. In the case where the substrate 1 is a laminate, the laminate may have a configuration that has a primer layer (not shown) between the constituent layers thereof.

The resin substrate for use for the substrate 1 may be formed of various synthetic resins. The synthetic resins include a polyethylene resin, a polypropylene resin, a polymethylpentene resin, a polyvinyl chloride resin, a polyvinylidene chloride resin, a polyvinyl alcohol resin, a vinyl chloride-vinyl acetate copolymer resin, an ethylene-vinyl acetate copolymer resin, an ethylene-vinyl alcohol copolymer resin, a polyethylene terephthalate resin, a polybutylene terephthalate resin, a polyethylene naphthalate-isophthalate copolymer resin, a polymethyl methacrylate resin, a polyethyl methacrylate resin, a polybutyl acrylate resin, a polyamide resin typified by nylon 6 or nylon 66, a cellulose triacetate resin, a cellophane, a polystyrene resin, a polycarbonate resin, a polyallylate resin, and a polyimide resin.

Examples of the metal substrate for use for the substrate 1 include aluminum, iron, stainless steel and copper. As the substrate, one plated with any of these metals is also usable.

Examples of the ceramic substrate for use for the substrate 1 include ceramic building materials such as calcium sulfate plates, calcium silicate plates, and wood cement plates, as well as porcelains, glass, enamels, and fired tiles.

Examples of the fibrous substrate for use for the substrate 1 include paper substrates such as tissue paper, kraft paper, titanium paper, linter paper, paper board and raw paper for gypsum board. These paper substrates may be further added with a resin such as an acrylic resin, a styrene-butadiene rubber, a melamine resin or an urethane resin (by immersing in such a resin after papermaking, or by adding such a resin during papermaking as an internal additive), for increasing the interlayer strength between the constituent fibers of the paper substrate or the interlayer strength between the other layer and the paper substrate, or for preventing fluffing. Examples of the paper substrate added with a resin include an interpaper reinforced paper, and a resin-infiltrated paper.

The fibrous substrate usable for the substrate 1 also includes a polyvinyl wallpaper material having a polyvinyl chloride resin layer formed on the surface of a paper substrate, which is often used in a field of building materials.

The fibrous substrate usable for the substrate 1 further includes coated paper, art paper, sulfate paper, glassine paper, parchment paper, paraffin paper and Japanese paper that are used in a business field or for ordinary printing or packaging.

The fibrous substrate usable for the substrate 1 also includes woven fabrics and nonwoven fabrics of various fibers having appearance and properties similar to those of paper. Various fibers include inorganic fibers such as glass fibers, asbestos fibers, potassium titanate fibers, alumina fibers, silica fibers and carbon fibers. Various fibers also include synthetic resin fibers such as polyester fibers, acrylic fibers and vinylon fibers. In use thereof, preferably, these paper materials are laminated with plastic substrates excellent in formativeness from the viewpoint of competence thereof to form raised patterns.

Examples of the woody substrate for use for the substrate 1 include wood veneer sheets, plywood, laminated wood, particle boards and middle-density fibrous plates (MDF).

The thickness of the substrate 1 is not specifically limited, but is, from the viewpoint of the mechanical strength, the handleability and the economic potential thereof, preferably 0.02 mm or more and 0.5 mm or less, more preferably 0.03 mm or more and 0.3 mm or less, even more preferably 0.04 mm or more and 0.1 mm or less.

<<Resin Layer>>

In the case where a raised profile including the first raised section 2 and the second raised section 3 is difficult to form on the surface of the substrate 1, it is preferable that a resin layer (not shown) is formed on the surface of the substrate, from the viewpoint of facilitating the formation of the first raised section 2 and the second raised section 3. The resin layer is preferably a layer of at least one selected from a two-component curable resin, a thermoplastic resin, a thermosetting resin and an ionizing radiation-curable resin.

The two-component curable resin includes a two-component curable polyurethane resin having an isocyanate as a curing agent, a two-component curable epoxy resin, a two-component curable urethane-modified acrylic resin, and a two-component curable polyester resin.

The thermoplastic resin includes an acrylic resin, a cellulose resin, an urethane resin, a polyvinyl chloride resin, a polyester resin, a polyolefin resin, polycarbonate, nylon, polystyrene and an ABS rein.

The thermosetting resin includes an acrylic resin, an urethane resin, a phenolic resin, an urea-melamine resin, an epoxy resin, an unsaturated polyester resin, and a silicone resin. If desired, a curing agent may be added to the thermosetting resin.

The ionizing radiation-curable resin is a composition containing a compound having an ionizing radiation-curable functional group. The ionizing radiation-curable functional group includes an ethylenically unsaturated double bond-having group such as a (meth)acryloyl group, a vinyl group and an allyl group, and also an epoxy group, and an oxetanyl group.

The ionizing radiation-curable resin is preferably a compound having an ethylenically unsaturated double bond-having group. From the viewpoint of preventing the resin layer from being damaged in a process of producing decorative sheets, the ionizing radiation-curable resin is more preferably a compound having two or more ethylenically unsaturated double bond-having groups, and is, above all, more preferably a polyfunctional (meth)acrylate compound having two or more ethylenically unsaturated double bond-having groups. The polyfunctional (meth)acrylate compound for use herein may be any of a monomer or an oligomer.

Ionizing radiation means one having an energy quantum capable of polymerizing or crosslinking molecules, among electromagnetic waves and charged particle radiations, and in general, ultraviolet rays (UV) or electron beams (EB) are used. In addition, electromagnetic waves such as X rays and γ rays, as well as charged particle radiations such as α rays, and ionic lines are also usable.

Among the polyfunctional (meth)acrylate compounds, Bifunctional (meth)acrylate monomers include ethylene glycol di(meth)acrylate, bisphenol A tetraethoxy diacrylate, bisphenol A tetrapropoxy diacrylate, and 1,6-hexanediol diacrylate.

Examples of tri- or more polyfunctional (meth)acrylate monomers include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, and isocyanuric acid-modified tri(meth)acrylate.

The above (meth)acrylate monomers may be modified in a part of the molecular skeleton thereof, and those modified with ethylene oxide, propylene oxide, caprolactone, isocyanuric acid, alkyl, cycloalkyl, aromatic or bisphenol can be used.

Polyfunctional (meth)acrylate oligomers include acrylate polymers such as urethane (meth)acrylate, epoxy (meth)acrylate, polyester (meth)acrylate, or polyether (meth)acrylate.

For example, urethane (meth)acrylate is prepared by reaction of a polyalcohol, an organic diisocyanate and a hydroxy(meth)acrylate.

Preferred epoxy (meth)acrylates are (meth)acrylates prepared by reaction of a tri- or higher polyfunctional aromatic epoxy resin, alicyclic epoxy resin or aliphatic epoxy resin and a (meth)acrylic acid, (meth)acrylates prepared by reaction of a polybasic acid, a (meth)acrylic acid, and a di- or more polyfunctional aromatic epoxy resin, alicyclic epoxy resin or an aliphatic epoxy resin, and (meth)acrylates prepared by reaction of a phenol compound, a (meth)acrylic acid, and a di- or higher polyfunctional aromatic epoxy resin, alicyclic epoxy resin or aliphatic epoxy resin.

One alone or two or more kinds of the above ionizing radiation-curable resins may be used either singly or as combined.

In the case where the ionizing radiation-curable resin is a UV-curable resin, the resin layer-forming composition preferably contains an additive such as a photopolymerization initiator or a photopolymerization accelerator.

The photopolymerization initiator may be one or more selected from acetophenone, benzophenone, α-hydroxyalkylphenone, Michler's ketone, benzoin, benzyl dimethyl ketal, benzoyl benzoate, α-acyloxime ester, and thioxanthones.

The photopolymerization accelerator can accelerate the curing speed by reducing inhibition of polymerization by air during curing. Examples of the photopolymerization accelerator include one or more selected from isoamyl p-climethylaminobenzoate, and ethyl p-climethylaminobenzoate.

On the surface of the substrate 1, a first raised section 2 and a second raised section 3 are provided. The first raised section 2 expresses an autumn wood (late wood) part, and the second raised section 3 expresses a springwood (early wood) part to form annual growth rings of grain. Preferably, the edges of the first raised section 2 and the second raised section 3 are not straight lines for exhibiting design properties similar to those of actual wood.

<First Raised Section>

The height Ha of the first raised section 2 is a height from the bottom of the first raised section 2 and the second raised section 3 of the substrate 1 to the top of the first raised section 2, as shown in FIG. 1(b). The height Ha of the first raised section 2 is, though not specifically limited but for the purpose of enhancing the effect of reproducing visual appearance and feeling, preferably 0.1 mm or more and 0.17 mm or less from the bottom of the first raised section 2 and the second raised section 3, more preferably 0.105 mm or more and 0.16 mm or less, even more preferably 0.11 mm or more and 0.15 mm or less.

The height Ha of the first raised section 2 can be measured using a 3D shape measuring device. Briefly, the height Ha of the first raised section 2 at 30 points existing in arbitrary portions of the surface of the substrate 1 is measured, and the resultant data are averaged to give an average value for the height. A specific measurement method is described in Examples.

The width of the first raised section 2 is an individual width of the first raised section 2 in the direction (in FIGS. 1(a)-(c), in the X direction) perpendicular to the lengthwise direction (in FIGS. 1(a)-(c), in the Y direction) of the substrate 1. The width of the first raised section 2 is, though not specifically limited but for the purpose of enhancing the effect of reproducing visual appearance and feeling, preferably 0.3 mm or more and 2.0 mm or less, more preferably mm or more and 1.8 mm or less, even more preferably 0.5 mm or more and 1.6 mm or less.

The width of the first raised section 2 can be measured using a 3D shape measuring device. Briefly, the width of the first raised section 2 at 30 points existing in arbitrary portions of the surface of the substrate 1 is measured, and the resultant data are averaged to give an average value for the width.

The distance between the first raised sections 2 in the direction (in FIGS. 1(a)-(c), in the X direction) perpendicular to the lengthwise direction (in FIGS. 1(a)-(c), in the Y direction) of the substrate is, though not specifically limited but for the purpose of enhancing the effect of reproducing visual appearance and feeling, preferably 0.1 mm or more and 5.4 mm or less, more preferably 0.3 mm or more and 5.2 mm or less, even more preferably 0.5 mm or more and mm or less.

The distance between the first raised sections 2 in the direction perpendicular to the lengthwise direction of the substrate can be measured using a 3D shape measuring device. Briefly, the distance between the first raised sections 2 in the direction perpendicular to the lengthwise direction of the substrate 1 at 30 points existing in arbitrary portions of the surface of the substrate 1 is measured and the resultant data are averaged to give an average value for the distance.

Figure 2:
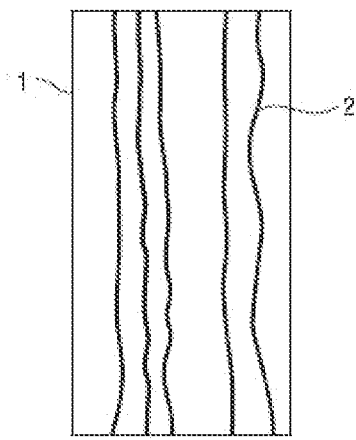
FIG. 2(a) is a view showing a form of the first raised section in a case where the raised woodgrain finish decorative material of a first embodiment of the present invention is a straight grained timber.
FIG. 2(b) is a view showing a form of the first raised section in a case where the raised woodgrain finish decorative material of a first embodiment of the present invention is a flat grained timber.
Figure 2:
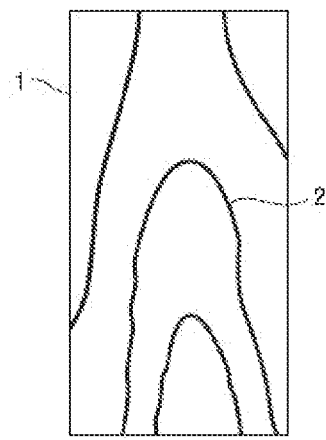

Preferably, the end of the first raised section 2 exists only at the edge of the substrate 1, as shown in FIGS. 2(a)-(b). In the case where the raised woodgrain finish decorative material is a straight grained timber, the end of the first raised section 2 exists only at the opposing edges of the substrate 1, as shown in FIG. 2(a). In the case where the raised woodgrain finish decorative material is a flat grained timber, the end of the first raised section 2 exists only at any edge of the substrate 1, as shown in FIG. 2(b).

<Second Raised Section>

The length Lb of the second raised section 3 is an individual length of the second raised section 3 in the lengthwise direction (in FIGS. 1(a)-(c), in the Y direction) of the substrate 1, as shown in FIG. 1(c). The length Lb of the second raised section 3 is, though not specifically limited but from the viewpoint of enhancing the effect of reproducing visual appearance, preferably 0.3 mm or more and 300 mm or less, more preferably 1 mm or more and 100 mm or less, even more preferably 2 mm or more and 30 mm or less.

The length of the second raised section 3 can be measured using a microscope. Briefly, the length of the second raised section 3 at 30 points existing in arbitrary portions of the surface of the substrate 1 is measured and the resultant data are averaged to give an average value for the length.

The height Hb of the second raised section 3 is a height from the bottom of the first raised section 2 and the second raised section 3 of the substrate 1 to the top of the second raised section 3, as shown in FIG. 1(b). The height Hb of the second raised section 3 is, though not specifically limited but for the purpose of enhancing the effect of reproducing visual appearance, preferably 0.03 mm or more and 0.09 mm or less from the bottom of the first raised section 2 and the second raised section 3, more preferably 0.035 mm or more and 0.085 mm or less, even more preferably 0.04 mm or more and 0.08 mm or less.

The height Hb of the second raised section 3 can be measured using a 3D shape measuring device. Briefly, the height Hb of the second raised section 3 at 30 points existing in arbitrary portions of the surface of the substrate 1 is measured and the resultant data are averaged to give an average value for the height.

The width of the second raised section 3 is an individual width of the second raised section 3 in the direction (in FIGS. 1(a)-(c), in the X direction) perpendicular to the lengthwise direction (in FIGS. 1(a)-(c), in the Y direction) of the substrate 1. The width of the second raised section 3 is, though not specifically limited but for the purpose of enhancing the effect of reproducing visual appearance, preferably 0.06 mm or more and 0.9 mm or less, more preferably 0.08 mm or more and 0.8 mm or less, even more preferably 0.1 mm or more and 0.7 mm or less.

The width of the second raised section 3 can be measured using a 3D shape measuring device. Briefly, the width of the second raised section 3 at 30 points existing in arbitrary portions of the surface of the substrate 1 is measured and the resultant data are averaged to give an average value for the width.

The proportion of the second raised section 3 to the proportion of the first raised section 2 in the surface of the substrate 1 is, though not specifically limited but for the purpose of enhancing the effect of reproducing visual appearance, preferably 0.5 or more and 2.0 or less, more preferably 0.6 or more and 1.9 or less, even more preferably 0.7 or more and 1.8 or less.

A measuring method for the proportion of the second raised section 3 to the proportion of the first raised section 2 in the surface of the substrate 1 is described. First, using a 3D shape measuring device, an arbitrary point of the surface of the substrate 1 is measured, and a plane surface (reference surface) to be a standard for measurement of height data is set, and thereafter area measurement is carried out. A height threshold value is set so as to select the first raised section 2 alone from the profile curve in the direction (in FIGS. 1(a)-(c), in the X direction) perpendicular to the lengthwise direction (in FIGS. 1(a)-(c), in the Y direction) of the substrate 1, and a surface area (surface area A) is integrated from it. Next, a height threshold value is set so as to select the first raised section 2 and the second raised section 3, and a surface area (surface area B) is integrated.

The surface area of the second raised section 3 is calculated by subtracting the surface area A from the surface area B. A proportion of the surface area of the second raised section 3 to the proportion of the surface area of the first raised section 2 at arbitrary 30 points is calculated according to the following expression (1), and the resultant data are averaged.

Surface area of second raised section/surface area of first raised section=(surface area B−surface area A)/surface area A   (1)

The proportion of the second raised section 3 to the residual part of the first raised section 2 in the surface of the substrate 1 is, though not specifically limited but for the purpose of enhancing the effect of reproducing visual appearance, preferably 0.1 or more and 0.8 or less, more preferably 0.2 or less and 0.7 or more, even more preferably 0.3 or more and 0.6 or less.

A measuring method for the proportion of the second raised section 3 to the residual part of the first raised section 2 in the surface of the substrate 1 is described. First, using a 3D shape measuring device, an arbitrary point of the surface of the substrate 1 is measured, and a plane surface (reference surface) to be a standard for measurement of height data is set, and thereafter area measurement is carried out. A height threshold value is set so as to select the first raised section 2 alone from the profile curve in the direction (in FIGS. 1(a)-(c), in the X direction) perpendicular to the lengthwise direction (in FIGS. 1(a)-(c), in the Y direction) of the substrate 1, and a surface area (surface area A) is integrated from it. Next, a height threshold value is set so as to select the first raised section 2 and the second raised section 3, and a surface area (surface area B) is integrated. The surface area of the second raised section 3 is calculated by subtracting the surface area A from the surface area B. The surface area of the residual part of the first raised section 2 is calculated by subtracting the surface area A from all the measured surface area (surface area C). A proportion of the surface area of the second raised section 3 to the residual part of the surface area of the first raised section 2 at arbitrary 30 points is calculated according to the following expression (2), and the resultant data are averaged.

Surface area of second raised section/surface area of residual part of first raised section=(surface area B−surface area A)/(surface area C−surface area A)   (2)

Figure 3:
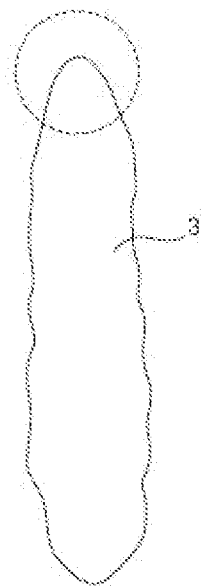
FIG. 3 is a schematic view showing a form of the top of the second raised section of a raised woodgrain finish decorative material of a first embodiment of the present invention.

Preferably, the end in the lengthwise direction (in FIGS. 1(a)-(c), in the Y direction) of the substrate 1 of the second raised section 3 has a narrowed and roundish form, as shown by the round part of a dotted line in FIG. 3. Such a narrowed and roundish form of the end of the second raised section 3 can provide design properties similar to those of a springwood (early wood) part of actual wood.

Figure 4:
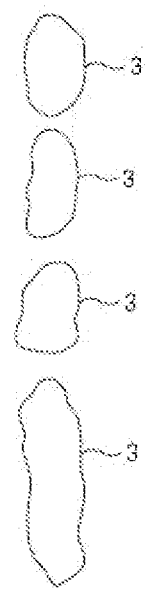
FIG. 4 is a schematic view showing a configuration of second raised sections in a raised woodgrain finish decorative material of a first embodiment of the present invention.

Preferably, the second raised sections 3 are aligned in series and at intervals in the lengthwise direction (in FIGS. 1(a)-(c), in the Y direction) of the substrate 1, as shown in FIG. 4. The second raised sections 3 aligned in series and at intervals can provide design properties similar to those of a springwood (early wood) part of actual wood.

<Pattern Layer>

Figure 5:
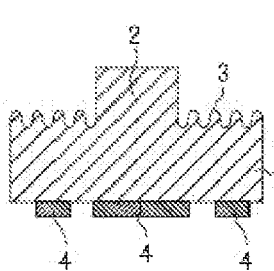
FIGS. 5(a)-(c) include schematic cross-sectional views each showing a configuration of pattern layers in a case where the raised woodgrain finish decorative material of a first embodiment of the present invention has pattern layers.
Figure 5:
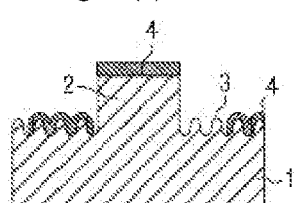
Figure 5:
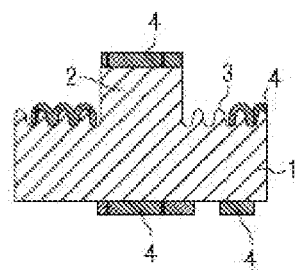

Preferably, the raised woodgrain finish decorative material further has a pattern layer 4 on the surface of at least one side of the substrate 1, as shown in FIGS. 5(a)-(c). The pattern layer 4 can be provided on the side opposite to the surface of the substrate 1 on which the first raised section 2 and the second raised section 3 are provided, as shown in FIG. 5(a). Also the pattern layer 4 can be provided on any of the first raised section 2 and the second raised section 3, as shown in FIG. 5(b). Also the pattern layer 4 can be provided on both sides of the substrate 1, as shown in FIG. 5(c).

The pattern layer 4 is preferably a woodgrain pattern. When the pattern layer 4 has a woodgrain pattern, the raised woodgrain finish decorative material can have a woodgrain appearance closely similar to the appearance of actual wood. The woodgrain pattern can be printed using a printing plate prepared by engraving an appearance of a raised plate of various trees, but in the present invention, in particular, woodgrain patterns of straight grained timbers or flat grained timber of Japanese cedar, pine, Japanese cypress or walnut tree are preferably employed, which can be favorably worked for raising to produce a good design appearance by protrusion or embossing of an autumn wood part from a springwood part.

For the pattern layer 4, colorants of pigment and/or dye are appropriately arranged so as to provide an intended design. The pattern layer 4 can be formed according to a printing method of offset printing, flexographic printing, gravure printing, silk screen printing, spray printing or inkjet printing, or according to a transfer method of transferring a printed pattern. The pattern layer 4 may be a single layer or may also be formed of 2 or more layers.

The ink to be used for forming the pattern layer 4 may be one prepared by appropriately mixing a colorant such as pigment or dye, as well as an extender, a solvent, a stabilizer, a plasticizer, a catalyst and a curing agent, in a binder resin.

Not specifically limited, examples of the binder resin include an acrylic resin, a styrenic resin, a polyester resin, an urethane resin, a chlorinated polyolefin resin, a vinyl chloride-vinyl acetate copolymer resin, a polyvinyl butyral resin, an alkyd resin, a petroleum resin, a ketone resin, an epoxy resin, a melamine resin, a fluororesin, a silicone resin, a cellulose derivative, and a rubber resin. These resins may be used alone or in the form of mixture of any two or more thereof.

Examples of the colorant include inorganic pigments such as red iron oxide, vermilion red, cadmium red, titanium yellow, chrome yellow, yellow iron oxide, ultramarine, iron blue, cobalt blue, green rust, iron black, carbon black, titanium white, zinc oxide, and antimony white; organic pigments and dyes such as quinacridone red, polyazole red, isoindolinone yellow, nickel-azo complex, phthalocyanine blue, azomethine azo black pigment, and perylene black pigment; metal pigments of scaly flakes of metals such as aluminum, brass or tin; and pearly pigments of scaly flakes of titanium dioxide-coated mica, basic lead carbonate, or shells such as pearl shells. These colorants may be used alone or in the form of mixture of any two or more thereof.

If desired, the pattern layer 4 may contain additives such an antioxidant a UV absorbent, an extender, a heat stabilizer, a plasticizer, and a surfactant.

The thickness of the pattern layer 4 is, from the viewpoint of favorably exhibiting design properties by the pattern, preferably 0.1 µm or more and 40 µm or less, more preferably 0.3 µm or more and 20 µm or less, even more preferably 0.5 µm or more and 10 µm or less.

In the case where the raised woodgrain finish decorative material has the pattern layer 4, preferably, the substrate 1 is transparent so that the color tone of the pattern layer 4 printed on at least one surface thereof is not influenced by the adherend to change.

<Lining Substrate>

Figure 6:
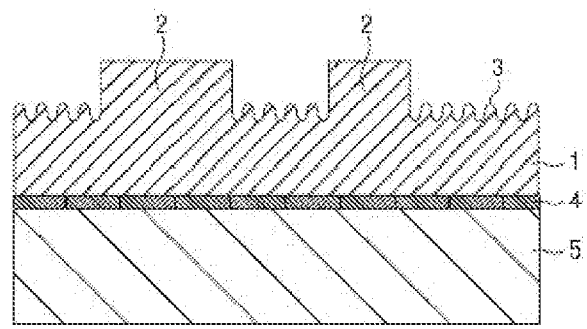
FIG. 6 is a schematic cross-sectional view showing a configuration of a lining substrate in a case where the raised woodgrain finish decorative material of a first embodiment of the present invention has a lining substrate.

Preferably, the raised woodgrain finish decorative material further has a lining substrate 5 on the side opposite to the surface of the substrate 1 on which the first raised section 2 and the second raised section 3 are provided, as shown in FIG. 6. The lining substrate 5 may be optionally provided for reinforcing the raised woodgrain finish decorative material, or for imparting adhesiveness to adherends, or for imparting concealing properties.

For the lining substrate 5, resin sheets, paper, nonwoven fabrics, fabrics and metal foils can be used. Among these, examples of resin sheets include sheets of an acrylic resin, a polyester resin, a polyolefin resin, a polyvinyl chloride resin, a polycarbonate resin, an epoxy resin, and an ABS resin.

The thickness of the lining substrate 5 is, from the viewpoint of enhancing reinforcing performance, adhesiveness and concealing performance, preferably 0.02 mm or more and 0.4 mm or less, more preferably 0.03 mm or more and 0.2 mm or less, even more preferably 0.04 mm or more and 0.1 mm or less.

<Adhesive Layer A>

Preferably, the raised woodgrain finish decorative material has an adhesive layer A (not shown) between at least one of the substrate 1 and the pattern layer 4, and the pattern layer 4 and the lining substrate 5. The adhesive layer A has a function to assist bonding of each layer of the substrate 1, the pattern layer 4 and the lining substrate 5, and can enhance the bonding of the layers.

Preferably, the adhesive layer A is formed of at least one selected from a two-component curable resin, a thermoplastic resin, a thermosetting resin and an ionizing radiation-curable resin.

<Primer Layer>

The raised woodgrain finish decorative material may optionally have a primer layer (not shown). Preferably, the primer layer is provided between at least one of the substrate 1 and the pattern layer 4, and the pattern layer 4 and the lining substrate 5. In the case where the raised woodgrain finish decorative material has a resin layer, preferably, the primer layer is provided between the substrate 1 and the resin layer. The primer layer is provided chiefly for the purpose of achieving an effect of enhancing the interlayer adhesiveness, and in the present invention, the layer additionally exhibits an effect of relaxing thermal shrinkage of each layer, and therefore can prevent reduction in the gloss owing to the difference in the thermal shrinkage between the layers and prevent change in the appearance owing to generation of cracks, therefore achieving excellent weather resistance.

In the case where the primer layer is provided on the side opposite to the surface side of the substrate (the primer layer in such a case is also referred to as "rear surface primer layer"), it exhibits a blocking effect in addition to the effect thereof to improve the interlayer adhesiveness between the raise woodgrain finish decorative material and the adherend. In the case where the lining substrate 5 is provided in the raised woodgrain finish decorative material, the rear surface primer layer is provided on the surface of the lining substrate 5. The rear surface primer layer has a function to assist bonding to an adherend such as a steel plate, an aluminum plate, wood or a plastic molded article, and therefore can enhance bonding to the adherend.

For forming the primer layer, a resin composition prepared by appropriately mixing a curing agent, a weather-proofing agent such as a UV absorbent or light stabilizers, and additives such as an anti-blocking agent in a binder resin can be used.

Examples of the binder resin include resins such as an urethane resin, an acryl-polyol resin, an acrylic resin, an ester resin, an amide resin, a butyral resin, a styrene resin, an urethane-acryl copolymer, a polycarbonate urethane-acryl copolymer (an urethane-acryl copolymer derived from a polymer (polycarbonate polyol) having a carbonate bond in the polymer main chain and having 2 or more hydroxy groups at the end and in the side chain thereof), a vinyl chloride-vinyl acetate copolymer resin, a vinyl chloride-vinyl acetate-acryl copolymer resin, a chlorinated propylene resin, a nitrocellulose resin (cellulose nitrate), and a cellulose acetate resin. These can be used singly or in combination of plural kinds thereof. For example, a mixture of a polycarbonate urethane-acryl copolymer and an acryl polyol resin can be used as the binder resin.

Besides the one-component curable resin, for example, resins of various types such as a two-component curable resin accompanied with a curing agent such as an isocyanate compound, e.g., tolylene diisocyanate (TDI), diphenylmethane diisocyanate (MDI), hexamethylene diisocyanate (HDI), isophorone diisocyanate (IPID), and xylylene diisocyanate (XDI), can also be used.

From the viewpoint of enhancing weather resistance, it is preferred that the primer layer contains a weather-proofing agent such as a UV absorbent, absorber and a light stabilizer.

The content of the UV absorbent in the primer layer is preferably 1 part by mass or more relative to 100 parts by mass of the resin constituting the primer layer, more preferably 5 parts by mass or more, even more preferably 10 parts by mass or more, and the upper limit thereof is preferably 40 parts by mass or less, more preferably 30 parts by mass or less, even more preferably 25 parts by mass or less.

The content of the light stabilizer in the primer layer is preferably 0.5 parts by mass or more relative to 100 parts by mass of the resin constituting the primer layer, more preferably 0.5 parts by mass or more, even more preferably 1 part by mass or more, further more preferably 1.5 parts by mass or more, especially preferably 2 parts by mass or more, and the upper limit is preferably 20 parts by mass or less, more preferably 15 parts by mass or less, even more preferably 10 parts by mass or less, especially more preferably 8 parts by mass or less. When the content of the UV absorbent and the light stabilizer in the primer layer each falls within the above range, the primer layer can exhibit excellent performance and can achieve excellent weather resistance.

Preferably, the primer layer contains an antiblocking agent from the viewpoint of preventing blocking of the raised woodgrain finish decorative materials during production and storage.

Examples of the antiblocking agent include oxides such as aluminum oxide, magnesium oxide, silica, calcium oxide, titanium oxide, and zinc oxide; hydroxides such as aluminum hydroxide, magnesium hydroxide, and calcium hydroxide; carbonates such as magnesium carbonate, and calcium carbonate; sulfates such as calcium sulfate, and barium sulfate; silicates such as magnesium silicate, aluminum silicate, calcium silicate, and aluminosilicate; and other inorganic compound-based antiblocking agents such as kaolin, talc, and diatomaceous earth. One alone or plural kinds of these may be used either singly or as combined.

Preferably, the inorganic compound-based antiblocking agent has an average particle size of 1 μm or more, more preferably 3 μm or more, and the upper limit thereof is preferably 8 μm or less, more preferably 7 μm or less. When the average particle size of the antiblocking agent falls within the above range, the antiblocking effect thereof is good, and the raised woodgrain finish decorative materials are hardly damaged when rubbed together.

The content of the antiblocking agent is preferably 0.1 parts by mass or more relative to 100 parts by mass of the resin constituting the primer layer, more preferably 0.3 parts by mass or more, even more preferably 0.5 parts by mass or more. The upper limit is preferably 5 parts by mass or less, more preferably 3 parts by mass or less, even more preferably 2 parts by mass or less.

The thickness of the primer layer is, from the viewpoint of achieving the effect of enhancing interlayer adhesiveness, and further the effect of relaxing thermal shrinkage of constitutive layers, preferably 1 µm or more, more preferably 2 µm or more, even more preferably 3 µm or more. The upper limit of the thickness of the primer layer is preferably 10 µm or less, more preferably 8 µm or less, even more preferably 6 µm or less.

<Adherend>

The raised woodgrain finish decorative material can be used alone, but can also be used as stuck to an adherend.

Examples of the adherend include a board of a material of every sort such as a flat plate and a curved plate, an article having a three-dimensional shape, and a sheet (or a film). Examples thereof include woody members to be used as a board or an article having a three-dimensional shape such as lumber single panels, which are produced from various materials such as Japanese cedar, cypress, pine tree, and lauan, lumber plywoods, particle boards, and MDF (middle density fiberboards); metal members to be used for boards of iron, aluminum, etc., or steel plates, articles having a three-dimensional shape, or sheets; ceramic members to be used for boards or articles having a three-dimensional shape such as glass, ceramics, e.g. porcelain, non-cement ceramic-based material, e.g., gypsum, and non-porcelain ceramic-based material, e.g., ALC (autoclaved lightweight concrete); and resin members to be used for boards, articles having a three-dimensional shape, or sheets such as an acrylic resin, a polyester resin, a polystyrene resin, and a polyolefin resin, e.g., polypropylene, an ABS (acrylonitrile-butadiene-styrene copolymer) resin, a phenol resin, a vinyl chloride resin, a cellulose resin, and a rubber. In addition, these members can be used singly or in combination of plural kinds thereof.

The adherend may be suitably selected from the foregoing materials according to an application. In the case of using for interior or exterior materials of buildings such as a wall, a ceiling, or a floor, and fittings or fixture members such as a window frame, a door, a handrail, a crown molding, a skirting board, and a molding, an adherend composed of at least one member selected from a woody member, a metal member, and a resin member is preferred. In the case of using for exterior materials, such a front door, and fittings such as a window frame and a door, an adherend composed of at least one member selected from a metal member and a resin member is preferred.

The thickness of the adherend may be suitably selected according to the application and the material, and it is preferably 0.1 mm or more and 10 mm or less, more preferably 0.3 mm or more and 5 mm or less, and still more preferably 0.5 mm or more and 3 mm or less.

(Adhesive Layer B)

In order to achieve excellent adhesive properties, the adherend and the raised woodgrain finish decorative material are preferably stuck to each other via an adhesive layer B.

The adhesive to be used for the adhesive layer B is not particularly limited, and a known adhesive can be used. For example, there are preferably exemplified adhesives such as a heat-sensitive adhesive and a pressure-sensitive adhesive. Examples of a resin which is used for the adhesive constituting this adhesive layer B include an acrylic resin, a polyurethane resin, a vinyl chloride resin, a vinyl acetate resin, a vinyl chloride-vinyl acetate copolymer resin, a styrene-acrylic copolymer resin, a polyester resin, and a polyamide resin. These can be used singly or in combination of plural kinds thereof. In addition, two-component curable resin polyurethane-based adhesive and polyester-based adhesive accompanied with a curing agent such as an isocyanate compound, are also applicable.

A pressure-sensitive adhesive can also be used for the adhesive layer B. As the pressure-sensitive adhesive, an acrylic, urethane-based, silicone-based, or rubber-based pressure-sensitive adhesive can be suitably selected and used.

The thickness of the adhesive layer B is not particularly limited. From the viewpoint of obtaining excellent adhesive properties, it is preferably 1 µm or more and 100 µm or less, more preferably 5 µm or more and 50 µm or less, and still more preferably 10 µm or more and 30 µm or less.

(Production Method for Raised Woodgrain Finish Decorative Material)

A production method for the raised woodgrain finish decorative material of the first embodiment of the present invention is described below.

In the raised woodgrain finish decorative material, the method of forming the first raised section 2 and the second raised section 3 in the substrate 1 is not specifically limited, and includes an embossing method that uses an embossing plate or a molding sheet, and a method of forming a raised profile in which a raised profile-having layer is transferred using a transfer sheet having a layer with a raised profile. In the present invention, from the viewpoint of productivity, embossing is preferred, and embossing that uses an embossing plate is more preferred.

For embossing, in general, an embossing method by thermal pressure using an embossing plate is preferred. In the embossing method by thermal pressure, the surface on the side of the surface protective layer of a decorative sheet is heated generally at 120 to 180° C. or so, and an embossing plate is pressed to the sheet under a pressure of generally 10 to 50 kg/cm² or so to impart the raised profile of the embossing plate thereto, then cooled and fixed, and in the method, a sheet-feed or rotary embossing machine can be used.

The embossing plate for use in emboss processing is preferably a laser embossing plate formed by laser-engraving, on the surface of a metal cylinder or plate, a desired raised profile and a complementary raised profile that has the same planar view profile as that of the desired raised profile but is inverted from the raised sections to thereby make the height of the first raised section and the second raised section differ from each other by control of the irradiation light intensity of a laser light (hereinafter this may be abbreviated as a laser embossing plate).

In the case of making an embossing plate having a complementary raised profile of the specific first raised section 2 and second raised section 3 in the present invention, using such a laser embossing plate, preferably, a plate making method mentioned below is employed.

[Plate Making Method 1]

(1) First, a raised wood plate to be a manuscript is prepared.

(2) Next, using a 3D surface roughness measuring device, information data of the height H (X, Y) at each position coordinate (X, Y) in the plane (in FIGS. 1(a)-(c), in the XY plane) of the wood plate surface are collected, and then the coordinates (X, Y) on the manuscript are converted into height information H (θ, Z) as converted into the coordinates (θ, Z) on the metal cylinder to be a material for the embossing plate.

(3) Next, while the metal cylinder is rotated around the axial core thereof, an engraving laser light is irradiated toward the surface of the cylinder and scanned thereon to control the irradiation light quantity E=kH (θ, Z) in accordance with the height H (θ, Z) with which the irradiation light quantity E of the laser light at the coordinate (θ, Z) of the cylinder is collected. Here, k is an appropriate coefficient. Accordingly, a raised profile is engraved on the surface of the metal cylinder, having a depth D (θ, Z)=kill (θ, Z) corresponding to the irradiation light quantity. Here, 1 is an appropriate coefficient.

(4) Via the above-mentioned steps, an embossing plate is produced, which has a raised profile with a depth D (θ, Z)=kill (θ, Z) corresponding to the height H (X, Y) of the raised wood plate surface of the manuscript on the surface of the metal cylinder.

[Plate Making Method 2]

(1) First, a raised wood plate to be a manuscript is prepared.

(2) Next, while the manuscript is lighted under an appropriate condition, the surface of the manuscript is read directly with a scanner, or a photographed positive image film or negative image film of the manuscript is read with a scanner, and according to any of the methods, information data of the optical density P (X, Y) on each position coordinate (X, Y) in the plane of the wood plate surface are collected. As a result, an optical density P (X, Y)=mH (X, Y) corresponding to the height H (X, Y) at each position coordinate (X, Y) in the plane of the wood plate surface is obtained. Here, m is an appropriate coefficient. Next, the data are converted into an optical density (θ, Z) at the coordinates (θ, Z) on the metal cylinder to be a material for the embossing plate.

(3) Next, the optical density P (θ, Z) of the cylinder is converted into height information H (θ, Z)=nP (θ, Z) of the cylinder. Here, n is an appropriate coefficient.

(4) Next, while the metal cylinder is rotated around the axial core thereof, an engraving laser light is irradiated toward the surface of the cylinder and scanned thereon to control the irradiation light quantity E=kH (θ, Z) in accordance with the height H (θ, Z) with which the irradiation light quantity E of the laser light at the coordinate (θ, Z) of the cylinder is collected. Here, k is an appropriate coefficient. Accordingly, a raised profile is engraved on the surface of the metal cylinder, having a depth D (θ, Z)=kill (θ, Z) corresponding to the irradiation light quantity. Here, 1 is an appropriate coefficient.

(5) Via the above-mentioned steps, an embossing plate is produced, which has a raised profile with a depth D (θ, Z)=kill (θ, Z) corresponding to the height H (X, Y) of the raised wood plate surface of the manuscript on the surface of the metal cylinder.

Using the laser-embossing plate produced in the manner as above, one surface of the substrate 1 is embossed, that is, a raised profile is given thereto by embossing with the embossing plate to thereby form a fine raised profile of the specific first raised section 2 and second raised section 3 of the present invention on one surface of the substrate 1, and the laser embossing plate takes a shorter production lifetime than that of an embossing plate to be formed by electrocasting, and is inexpensive.

According to the raised woodgrain finish decorative material of the first embodiment of the present invention, there can be provided an inexpensive decorative material exhibiting design properties similar to those of actual wood by the effect of reproducing visual appearance and feeling within a short production timeline.

Second Embodiment

[Raised Woodgrain Finish Decorative Material]

The raised woodgrain finish decorative material of a second embodiment of the present invention has, as shown in FIGS. 8(a)-(c), a substrate 1, a first raised section 2 provided on one surface of the substrate 1 (in FIGS. 8(a)-(c), the upper side of the raised woodgrain finish decorative material, that is, the surface on the side of the +Z direction), a slope section 10 provided on the one surface of the substrate 1 in a different location than the location of the first raised section 2 in a planar view (in FIGS. 8(a)-(c), an appearance toward the −Z direction from the side of the +Z direction), and a second raised section 3 provided on the one surface of the substrate 1 in at least any of a different location than the location of the first raised section 2 and a location of the slope section 10. The height Ha of the first raised section 2 is the same as or higher than the height Hc of the top of the slope section 10 in the thickness direction (in FIGS. 8(a)-(c), in the Z direction) of the substrate 1. The height Ha of the first raised section 2 is higher than the height Hb of the second raised section 3 in the thickness direction (in FIGS. 8(a)-(c), in the Z direction) of the substrate 1.

The raised woodgrain finish decorative material includes, though not specifically limited thereto, Japanese cedar, Japanese cypress, walnut tree, pine and cherry, as a wood material intended to reproduce the design thereof.

Description of the constitutive members that are the same as in the raised woodgrain finish decorative material of the first embodiment is omitted here.

<Substrate>

The form of the substrate 1 may be any of a sheet, a film or a plate.

Not specifically limited, the substrate 1 may be any general one usable for decorative materials, and may be selected from resin substrates, metal substrates, ceramic substrates, fibrous substrates and woody substrates in accordance with the intended use thereof. One alone of these substrates may be used, or the substrate may also be in the form of a laminate in any combination thereof, such as a composite of a resin substrate and a metal substrate. In the case where the substrate 1 is a laminate, the laminate may have a configuration that has a primer layer (not shown) between the constituent layers thereof.

Resin substrates, metal substrates, ceramic substrates, fibrous substrates and woody substrates for use as the substrate 1 may be the same as those described for the first embodiment.

The thickness of the substrate 1 is not specifically limited, but is, from the viewpoint of the mechanical strength, the handleability and the economic potential thereof, preferably 0.02 mm or more and 20.00 mm or less, more preferably 0.03 mm or more and 5.00 mm or less, even more preferably 0.04 mm or more and 0.10 mm or less.

<<Resin Layer>>

In the case where a raised profile including the first raised section 2 and the second raised section 3 and a slope profile of the slope section 10 are difficult to form on the surface of the substrate 1, it is preferable that a resin layer (not shown) is formed on the surface of the substrate, from the viewpoint of facilitating the formation of the first raised section 2, the second raised section 3 and the slope section 10. The resin layer is preferably a layer of at least one selected from a two-component curable resin, a thermoplastic resin, a thermosetting resin and an ionizing radiation-curable resin.

The two-component curable resin, the thermoplastic resin, the thermosetting resin and the ionizing radiation-curable resin for use for the resin layer may be the same as those described for the first embodiment.

The thickness of the resin layer is, from the viewpoint of providing the first raised section 2, the second raised section 3 and the slope section 10, preferably not lower than the height of the first raised section 2. The thickness of the resin layer is preferably higher by 0.5 µm or more than the height of the first raised section 2, more preferably by 0.8 µm or more, even more preferably by 1.0 µm or more.

On the surface of the substrate 1, a first raised section 2, a second raised section 3 and a slope section 10 are provided.

The first raised section 2 and the second raised section 3 each express an autumn wood (late wood) part and a spring wood (early wood) part, respectively, to form annual growth rings of grain. Preferably, the edges of the first raised section 2 and the second raised section 3 are not straight lines for exhibiting design properties similar to those of actual wood.

The slope section 10 can express an autumn wood part or a springwood part having different slopes on both sides thereof, in a flat-grained timber having broad and irregularly curved annual rings. One side of the first raised section 2 on which the slope section 10 exists expresses a gently sloped autumn wood part or a springwood part, and is given a different expression of the other side of the first raised section 2 not having a slope section 10 that expresses a steep autumn wood part or a springwood part, as shown in FIG. 8(b).

<Slope Section>

The inclination angle θ of the slope section 10 is an angle based on the surface of the substrate 1 provided with the slope section 10, as shown in FIG. 8(b). The inclination angle θ of the slope section 10 is, from the viewpoint of expressing a gently sloped autumn wood (late wood) part or a springwood (early wood) part and enhancing the visual effect, preferably 3 degrees or more and 70 degrees or less, more preferably 5 degrees or more and 65 degrees or less, even more preferably 10 degrees or more and 60 degrees or less.

The inclination angle θ of the slope section 10 can be measured using a 3D shape measuring device. Briefly, the inclination angle θ of the slope section 10 at 10 points existing in arbitrary portions of a cross-sectional image including the slope section 10 is measured and the resultant data are averaged to give an average value for the inclination angle.

In the case where the slope section 10 corresponds to an appearance of a gently sloping section of a springwood part of a raised woodgrain board, preferably, the slope section extends from one neighboring first raised section 2 to the other neighboring first raised section 2, as shown in FIGS. 8(a) and (b). In addition, also as shown in FIGS. 8(a) and (b), second raised sections 3 are positioned to rise from the surface of the slope section 10. Having such a profile, the slope section 10 can express a springwood part having a gentle slope and can enhance a visual effect.

In the case where the slope section 10 corresponds to an appearance of a gently sloping section of an autumn wood part of a raised woodgrain board, though not shown, the slope section 10 is so arranged that it is localized around the first raised section 2 without extending from one neighboring first raised section 2 to the other neighboring first raised section 2, and that second raised sections 3 can rise from the surface of a flat region between the slope section 10 and a first raised section 2 adjacent thereto. Having such a profile, the slope section 10 can express an autumn wood part having a gentle slope and can enhance a visual effect.

<First Raised Section>

The height Ha of the first raised section 2 is a height from the surface of the substrate 1 to the top of the first raised section 2, as shown in FIG. 8(b). The height Ha of the first raised section 2 is, though not specifically limited but for the purpose of enhancing a visual effect and feeling, preferably 0.050 mm or more and 0.500 mm or less from the surface of the substrate, more preferably 0.080 mm or more and 0.400 mm or less, even more preferably 0.100 mm or more and 0.300 mm or less.

The height Ha of the first raised section 2 can be measured using a 3D shape measuring device. Briefly, the height Ha of the first raised section 2 at 30 points existing in arbitrary portions of the surface of the substrate 1 is measured and the resultant data are averaged to give an average value for the height.

The width of the first raised section 2 is an individual width of the first raised section 2 in the direction (in FIGS. 8(a)-(c), in the X direction) perpendicular to the lengthwise direction (in FIGS. 8(a)-(c), in the Y direction) of the substrate 1. The width of the first raised section 2 is, though not specifically limited but for the purpose of enhancing a visual effect and feeling, preferably 0.20 mm or more and 5.0 mm or less, more preferably 0.30 mm or more and 4.00 mm or less, even more preferably 0.50 mm or more and 3.00 mm or less.

The width of the first raised section 2 can be measured using a 3D shape measuring device or a microscope. Briefly, the width of the first raised section 2 at 30 points existing in arbitrary portions of the surface of the substrate 1 is measured and the resultant data are averaged to give an average value for the width.

The distance between the first raised sections 2 in the direction (in FIGS. 8(a)-(c), in the X direction) perpendicular to the lengthwise direction (in FIGS. 8(a)-(c), in the Y direction) of the substrate is, though not specifically limited but for the purpose of enhancing a visual effect and feeling, preferably 0.20 mm or more and 30.00 mm or less, more preferably 0.30 mm or more and 25.00 mm or less, even more preferably 0.50 mm or more and 5.00 mm or less.

The distance between the first raised sections 2 in the direction perpendicular to the lengthwise direction of the substrate can be measured using a 3D shape measuring device or a microscope. Briefly, the distance between the first raised sections 2 in the direction perpendicular to the lengthwise direction of the substrate at 30 points existing in arbitrary portions of the surface of the substrate 1 is measured and the resultant data are averaged to give an average value for the distance.

Preferably, the end of the first raised section 2 exists only at the edge of the substrate 1. In the case where the raised woodgrain finish decorative material is a straight grained timber, the end of the first raised section 2 exists only at the opposing edges of the substrate 1. In the case where the raised woodgrain finish decorative material is a flat grained timber, the end of the first raised section 2 exists only at any edge of the substrate 1.

<Second Raised Section>

Figure 8:
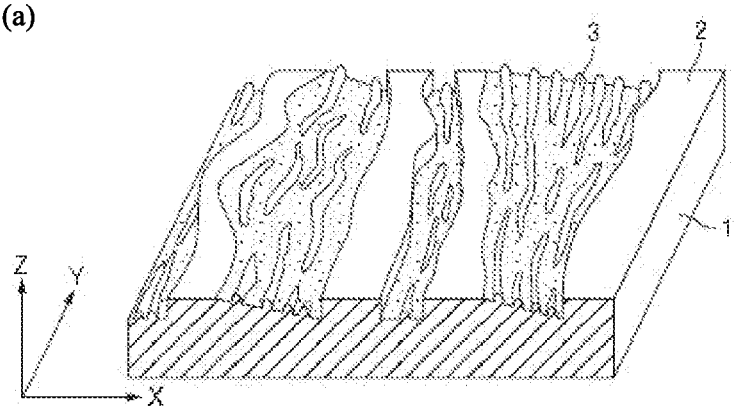
FIG. 8(*c*) is a schematic plan view of a raised woodgrain finish decorative material of a second embodiment of the present invention.
Figure 8:
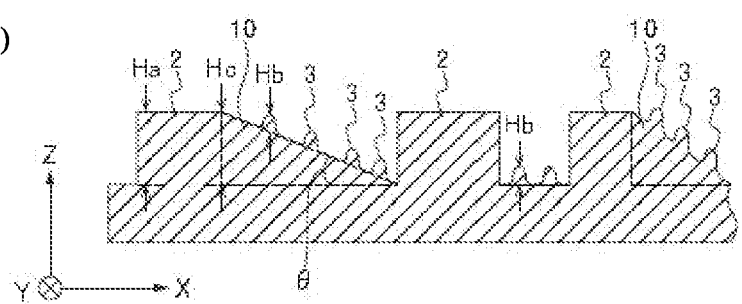
Figure 8:
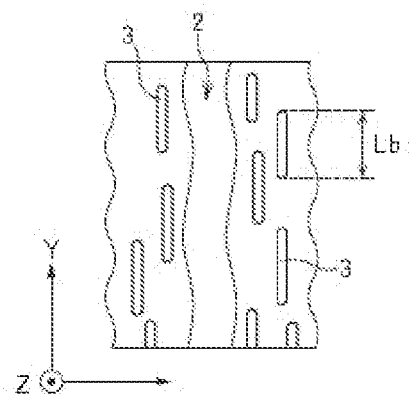

The length Lb of the second raised section 3 is an individual length of the second raised section 3 in the lengthwise direction (in FIG. 8, in the Y direction) of the substrate 1, as shown in FIGS. 8(a)-(c). The length Lb of the second raised section 3 is, though not specifically limited but from the viewpoint of enhancing a visual effect, preferably 0.30 mm or more and 300.00 mm or less, more preferably 1.00 mm or more and 100.00 mm or less, even more preferably 2.00 mm or more and 30.00 mm or less.

The length of the second raised section 3 can be measured using a 3D shape measuring device or a microscope. Briefly, the length of the second raised section 3 at 30 points existing in arbitrary portions of the surface of the substrate 1 is measured and the resultant data are averaged to give an average value for the length.

The height Hb of the second raised section 3 is a height from the surface of the substrate 1 or the surface of the slope section 10 to the top of the second raised section 3, as shown in FIG. 8(b). The height Hb of the second raised section 3 is, though not specifically limited but for the purpose of enhancing a visual effect, preferably 0.02 mm or more and 0.10 mm or less from the surface of the substrate, more preferably 0.03 mm or more and 0.09 mm or less, even more preferably 0.04 mm or more and 0.08 mm or less.

The height Hb of the second raised section 3 can be measured using a 3D shape measuring device. Briefly, the height Hb of the second raised section 3 at 30 points existing in arbitrary portions of the surface of the substrate 1 is measured and the resultant data are averaged to give an average value for the height.

The width of the second raised section 3 is an individual width of the second raised section 3 in the direction (in FIGS. 8(a)-(c), in the X direction) perpendicular to the lengthwise direction (in FIGS. 8(a)-(c), in the Y direction) of the substrate 1. The width of the second raised section 3 is, though not specifically limited but for the purpose of enhancing a visual effect, preferably mm or more and 0.90 mm or less, more preferably 0.08 mm or more and 0.80 mm or less, even more preferably 0.10 mm or more and 0.70 mm or less.

The width of the second raised section 3 can be measured using a 3D shape measuring device or a microscope. Briefly, the width of the second raised section 3 at 30 points existing in arbitrary portions of the surface of the substrate 1 is measured and the resultant data are averaged to give an average value for the width.

The proportion of the second raised section 3 to the proportion of the first raised section 2 in the surface of the substrate 1 is, though not specifically limited but for the purpose of enhancing a visual effect, preferably 0.50 or more and 4.00 or less, more preferably 0.60 or more and 3.00 or less, even more preferably 0.80 or more and 2.00 or less.

The proportion of the second raised section 3 to the proportion of the first raised section 2 in the surface of the substrate 1 can be measured using a 3D shape measuring device. Briefly, the proportion of the second raised section 3 to the proportion of the first raised section 2 in arbitrary 30 portions in the surface of the substrate 1 is calculated, and the resultant data are averaged to give an average value for the ratio.

The proportion of the second raised section 3 to the residual part of the first raised section 2 in the surface of the substrate 1 is, though not specifically limited but for the purpose of enhancing a visual effect, preferably 0.10 or more and 3.00 or less, more preferably 0.20 or less and 2.00 or more, even more preferably 0.30 or more and 1.00 or less.

The proportion of the second raised section 3 to the residual part of the first raised section 2 in the surface of the substrate 1 can be measured using a 3D shape measuring device. Briefly, the proportion of the second raised section 3 to the proportion of residual part of the first raised section 2 in arbitrary 30 portions in the surface of the substrate 1 is calculated, and the resultant data are averaged to give an average value for the ratio.

Preferably, the end in the lengthwise direction (in FIGS. 8(a)-(c), in the Y direction) of the substrate 1 of the second raised section 3 has a narrowed and roundish form. Such a narrowed and roundish form of the end of the second raised section 3 can provide design properties similar to those of a springwood (early wood) part of actual wood.

Preferably, the second raised sections 3 are aligned in series and at intervals in the lengthwise direction (in FIGS. 8(a)-(c), in the Y direction) of the substrate 1. The second raised sections 3 aligned in series and at intervals can provide design properties similar to those of a springwood (early wood) part of actual wood.

<Pattern Layer>

Figure 9:
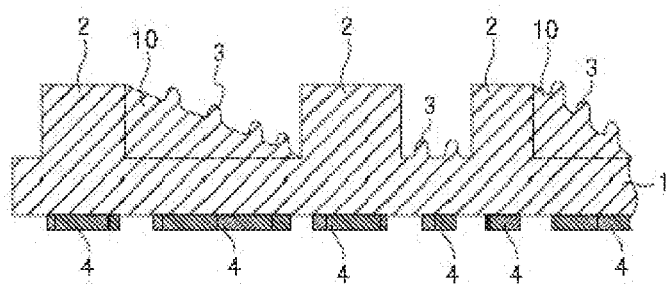
FIGS. 9(*a*)-(*c*) include schematic cross-sectional views each showing a configuration of pattern layers in a case where the raised woodgrain finish decorative material of a second embodiment of the present invention has pattern layers.
Figure 9:
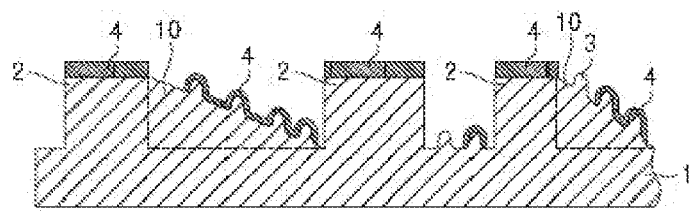
Figure 9:
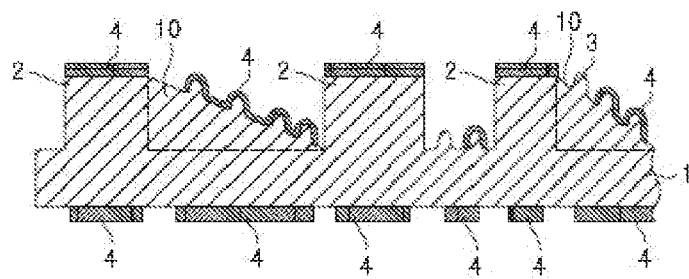

Preferably, the raised woodgrain finish decorative material further has a pattern layer 4 on the surface of at least one side of the substrate 1, as shown in FIGS. 9(a)-(c). The pattern layer 4 can be provided on the side opposite to the surface of the substrate 1 on which the first raised section 2 and the second raised section 3 are provided, as shown in FIG. 9(a). Also the pattern layer 4 can be provided on any of the first raised section 2 and the second raised section 3, as shown in FIG. 9(b). Also the pattern layer 4 can be provided on both sides of the substrate 1, as shown in FIG. 9(c).

The pattern layer 4 is preferably a woodgrain pattern. When the pattern layer 4 has a woodgrain pattern, the raised woodgrain finish decorative material can have a woodgrain appearance closely similar to the appearance of actual wood.

The method and the material for formation of the pattern layer 4 can be the same as those described for the first embodiment.

The thickness of the pattern layer 4 is, from the viewpoint of favorably exhibiting design properties by the pattern, preferably 0.1 µm or more and 40 µm or less, more preferably 0.3 µm or more and 20 µm or less, even more preferably 0.5 µm or more and 10 µm or less.

In the case where the raised woodgrain finish decorative material has the pattern layer 4, preferably, the substrate 1 is transparent so that the color tone of the pattern layer 4 printed on at least one surface thereof is not influenced by the adherend to change.

<Lining Substrate>

Figure 10:
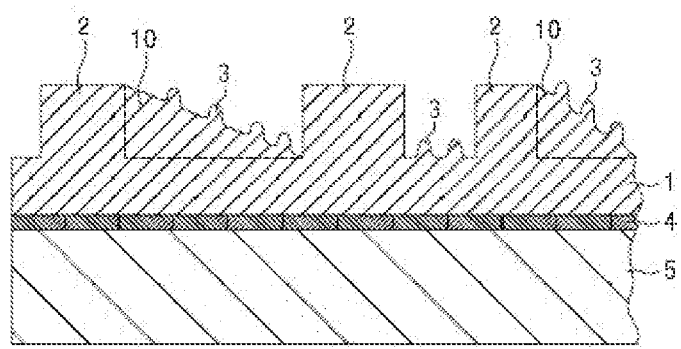
FIG. 10 is a schematic cross-sectional view showing a configuration of a lining substrate in a case where the raised woodgrain finish decorative material of a second embodiment of the present invention has a lining substrate.

Preferably, the raised woodgrain finish decorative material further has a lining substrate 5 on the side opposite to the surface of the substrate 1 on which the first raised section 2, the second raised section 3 and the slope section 10 are provided, as shown in FIG. 10. The lining substrate 5 may be optionally provided for reinforcing the raised woodgrain finish decorative material, or for imparting adhesiveness to adherends, or for imparting concealing properties.

The thickness of the lining substrate 5 is, from the viewpoint of enhancing reinforcing performance, adhesiveness and concealing performance, preferably 0.02 mm or more and 0.50 mm or less, more preferably 0.03 mm or more and 0.40 mm or less, even more preferably 0.04 mm or more and 0.30 mm or less.

<Adhesive Layer A>

Preferably, the raised woodgrain finish decorative material has an adhesive layer A (not shown) between at least one of the substrate and the pattern layer 4, and the pattern layer 4 and the lining substrate 5. The adhesive layer A has a function to assist bonding of each layer of the substrate 1, the pattern layer 4 and the lining substrate 5, and can enhance the bonding of the layers.

Preferably, the adhesive layer A is formed of at least one selected from a two-component curable resin, a thermoplastic resin, a thermosetting resin and an ionizing radiation-curable resin. The resin layer A may be the same as that described for the first embodiment.

<Primer Layer>

The raised woodgrain finish decorative material may optionally have a primer layer (not shown). Preferably, the primer layer is provided between at least one of the substrate 1 and the pattern layer 4, and the pattern layer 4 and the lining substrate 5. In the case where the raised woodgrain finish decorative material has a resin layer, preferably, the primer layer is provided between the substrate 1 and the resin layer. The primer layer is provided chiefly for the purpose of achieving an effect of enhancing the interlayer adhesiveness, and in the present invention, the layer additionally exhibits an effect of relaxing thermal shrinkage of each layer, and therefore can prevent reduction in the gloss owing to the difference in the thermal shrinkage between the layers and prevent change in the appearance owing to generation of cracks, therefore achieving excellent weather resistance.

In the case where the primer layer is provided on the side opposite to the surface side of the substrate (the primer layer in such a case is also referred to as "rear surface primer layer"), it exhibits a blocking effect in addition to the effect thereof to improve the interlayer adhesiveness between the raise woodgrain finish decorative material and the adherend. In the case where the lining substrate 5 is provided in the raised woodgrain finish decorative material, the rear surface primer layer is provided on the surface of the lining substrate 5. The rear surface primer layer has a function to assist bonding to an adherend such as a steel plate, an aluminum plate, wood or a plastic molded article, and therefore can enhance bonding to the adherend.

The primer layer may be the same as that described for the first embodiment.

<Adherend>

The raised woodgrain finish decorative material can be used alone, but can also be used as stuck to an adherend.

The adherend may be the same as that described for the first embodiment.

The thickness of the adherend may be suitably selected according to the application and the material, and it is preferably 0.1 mm or more and 20 mm or less, more preferably 0.3 mm or more and 10 mm or less, and even more preferably 0.5 mm or more and 5 mm or less.

(Adhesive Layer B)

In order to achieve excellent adhesive properties, the adherend and the raised woodgrain finish decorative material are preferably stuck to each other via an adhesive layer B.

The adhesive layer B may be the same as that described for the first embodiment.

(Production Method for Raised Woodgrain Finish Decorative Material)

A production method for the raised woodgrain finish decorative material of the second embodiment of the present invention is described below.

In the raised woodgrain finish decorative material, the method of forming the first raised section 2, the second raised section 3 and the slope section 10 in the substrate 1 is not specifically limited, and includes an embossing method that uses an embossing plate or a molding sheet, and a method of forming a raised profile and a slope form in which a transfer sheet having a layer with a raised profile and a slope form is used and the layer having a raised profile and a slope form is transferred. In the present invention, from the viewpoint of productivity, embossing is preferred, and embossing that uses an embossing plate is more preferred.

For embossing, in general, an embossing method by thermal pressure using an embossing plate is preferred. In the embossing method by thermal pressure, the surface on the side of the surface protective layer of a decorative sheet is heated generally at 120 to 180° C. or so, and an embossing plate is pressed to the sheet under a pressure of generally 10 to 50 kg/cm$^2$ or so to impart the raised profile of the embossing plate thereto, then cooled and fixed, and in the method, a sheet-feed or rotary embossing machine can be used.

The embossing plate for use in emboss processing is preferably a laser embossing plate formed by laser-engraving, on the surface of a metal cylinder or plate, a desired raised profile and a complementary raised profile that has the same planar view profile as that of the desired raised profile but is inverted from the raised sections to thereby make the height of the first raised section and the second raised section differ from each other by control of the irradiation light intensity of a laser light (hereinafter this may be abbreviated as a laser embossing plate).

In the case of making an embossing plate having a precise raised profile of the first raised section 2 and the second raised section 3, and a slope-forming complementary raised profile of the slope section 10, preferably, a plate making method mentioned below is employed.

[Plate Making Method 1]

(1) First, a raised wood plate to be a manuscript is prepared.
(2) Next, using a 3D surface roughness measuring device, information data of the height H (X, Y) at each position coordinate (X, Y) in the plane (in FIGS. 8(a)-(c), in the XY plane) of the wood plate surface are collected, and then the coordinates (X, Y) on the manuscript are converted into height information H (θ, Z) as converted into the coordinates (θ, Z) on the metal cylinder to be a material for the embossing plate.
(3) Next, while the metal cylinder is rotated around the axial core thereof, an engraving laser light is irradiated toward the surface of the cylinder and scanned thereon to control the irradiation light quantity E=kH (θ, Z) in accordance with the height H (θ, Z) with which the irradiation light quantity E of the laser light at the coordinate (θ, Z) of the cylinder is collected. Here, k is an appropriate coefficient. Accordingly, a raised profile is engraved on the surface of the metal cylinder, having a depth D (θ, Z)=kiH (θ, Z) corresponding to the irradiation light quantity. Here, 1 is an appropriate coefficient.
(4) Via the above-mentioned steps, an embossing plate is produced, which has a raised profile with a depth D (θ, Z)=kiH (θ, Z) corresponding to the height H (X, Y) of the raised wood plate surface of the manuscript on the surface of the metal cylinder.

[Plate Making Method 2]

(1) First, a raised wood plate to be a manuscript is prepared.
(2) Next, while the manuscript is lighted under an appropriate condition, the surface of the manuscript is read directly with a scanner, or a photographed positive image film or negative image film of the manuscript is read with a scanner, and according to any of the methods, information data of the optical density P (X, Y) on each position coordinate (X, Y) in the plane of the wood plate surface are collected. As a result, an optical density P (X, Y)=mH (X, Y) corresponding to the height H (X, Y) at each position coordinate (X, Y) in the plane of the wood plate surface is obtained. Here, m is an appropriate coefficient. Next, the data are converted into an optical density P (θ, Z) at the coordinates (θ, Z) on the metal cylinder to be a material for the embossing plate.

(3) Next, the optical density P (θ, Z) of the cylinder is converted into height information H (θ, Z)=nP (θ, Z) of the cylinder. Here, n is an appropriate coefficient.

(4) Next, while the metal cylinder is rotated around the axial core thereof, an engraving laser light is irradiated toward the surface of the cylinder and scanned thereon to control the irradiation light quantity E=kH (θ, Z) in accordance with the height H (θ, Z) with which the irradiation light quantity E of the laser light at the coordinate (θ, Z) of the cylinder is collected. Here, k is an appropriate coefficient. Accordingly, a raised profile is engraved on the surface of the metal cylinder, having a depth D (θ, Z)=kill (θ, Z) corresponding to the irradiation light quantity. Here, 1 is an appropriate coefficient.

(5) Via the above-mentioned steps, an embossing plate is produced, which has a raised profile with a depth D (θ, Z)=kill (θ, Z) corresponding to the height H (X, Y) of the raised wood plate surface of the manuscript on the surface of the metal cylinder.

Using the laser-embossing plate produced in the manner as above, one surface of the substrate 1 is embossed, that is, a raised profile is given thereto by embossing with the embossing plate to thereby form a fine raised profile of the specific first raised section 2 and second raised section 3 and a slope form of the slope section 10 of the present invention on one surface of the substrate 1, and the laser embossing plate takes a shorter production lifetime than that of an embossing plate to be formed by electrocasting, and is inexpensive.

According to the raised woodgrain finish decorative material of the second embodiment of the present invention, there can be provided an inexpensive decorative material having a short production timeline and exhibiting design properties similar to those of actual wood by the effect of reproducing visual appearance and feeling.

EXAMPLES

Next, the present invention is described in more detail by reference to Examples, but it should be construed that the present invention is by no means limited by these Examples.

Example 1-1

A polypropylene resin sheet having been subjected to a two-sided corona discharge treatment (thickness: 60 μm) was used as a substrate 1. A printing ink containing a binder of a two-component curable acryl-urethane resin was applied on one surface of the substrate 1 according to a gravure printing method to form a woodgrain pattern layer 4 (thickness: 3 μm), and a resin composition containing a two-component curable urethane-cellulose nitrate mixed resin (containing a curing agent of hexamethylene diisocyanate in an amount of 5 parts by mass relative to 100 parts by mass of the resin) was applied to the other surface to form a rear primer layer (thickness: 3 μm). A transparent polyurethane resin adhesive was applied onto the pattern layer 4 to form an adhesive layer (thickness after dried: 3 μm), and a transparent polypropylene resin was melt-extruded thereonto with heating through a T-die extruder to form a transparent resin layer (thickness: 80 μm).

Next, the resin layer was heated to be softened, and embossed from the side of the resin layer to form a first raised section 2 and a second raised section 3 in the surface of the resin layer. For the embossing treatment in this step, an embossing plate having a complementary raised profile having the same planar view profile as that of the first raised section 2 and the second raised section 3 but inverted from the profile of the raised sections was used to form a raised profile in the resin layer, and accordingly, a resin layer having a raised profile where the side surface of one of the first raised section 2 and the second raised section 3 was curved upwardly to be convexed (in FIG. 7, curved upwardly in the +Z direction) was formed, as shown in FIG. 7, and thus, a raised woodgrain finish decorative material of Example 1-1 was produced.

Examples 1-2 to 1-7 and Comparative Example 1-1

Raised woodgrain finish decorative materials of Examples 1-2 to 1-7 and Comparative Example 1-1 were produced in the same manner as in Example 1-1 except that the embossing plate for use for embossing treatment was changed.

[Measurement and Evaluation]

The sheets produced in Examples 1-1 to 1-7 and Comparative Example 1-1 were measured and evaluated as follows. The results are shown in Table 1.

<Profile Measurement of First Raised Section and Second Raised Section>

Using a 3D shape measuring device "VR-3000" from Keyence Corporation, the side of the substrate 1 having the first raised section 2 and the second raised section 3 was photographed, and then analyzed using the accompanying analysis application.

Three portions on the side of the substrate 1 having the first raised section 2 and the second raised section 3 were measurement regions (about 24 mm×about 18 mm). A plane (reference plane) to be a base level for the measurement for height data was set, and each parameter was measured.

(1) Height Measurement

At 30 points in 10 portions in the direction (in FIGS. 1(*a*)-(*c*), in the X direction) perpendicular to the lengthwise direction (in FIGS. 1(*a*)-(*c*), in the Y direction), the first raised section 2 and the second raised section 3 each were analyzed to give a profile curve. Based on JIS B0601:2001, the maximum height roughness (Rz) at a cutoff value of 0.8 mm was calculate.

(2) Width and Distance Measurement

At 10 points in 3 measurement regions, totaling 30 points, arbitrary width and distance were measured in plane, and from the measurement images by a 3D shape measuring device, width and distance data were calculated and averaged to give average values.

(3) Proportion of Second Raised Section to First Raised Section

First, arbitrary portions in the surface of the substrate 1 were measured using a 3D shape measuring device, and a plane (reference plane) to be a base level for the measurement for height data was set, and the area was measured. A height threshold value was set so as to select the first raised section 2 alone from the profile curve in the direction (in FIGS. 1(*a*)-(*c*), in the X direction) perpendicular to the lengthwise direction (in FIGS. 1(*a*)-(*c*), in the Y direction) of the substrate 1, and the surface area was integrated from it (surface area A). Next, a height threshold value was set so as to select the first raised section 2 and the second raised section 3, and a surface area (surface area B) was integrated. The surface area of the second raised section 3 was calculated by subtracting the surface area A from the surface area B. A proportion of the surface area of the second raised section 3 to the proportion of the surface area of the first raised section 2 at arbitrary 30 points was calculated according to the following expression (1), and the resultant data were averaged.

$$\text{Surface area of second raised section/surface area of first raised section} = (\text{surface area } B - \text{surface area } A)/\text{surface area } A \quad (1)$$

(4) Proportion of Second Raised Section to Residual Part of First Raised Section First, using a 3D shape measuring device, an arbitrary point of the surface of the substrate 1 was measured, and a plane surface (reference surface) to be a standard for measurement of height data was set, and thereafter area measurement was carried out. A height threshold value was set so as to select the first raised section 2 alone from the profile curve in the direction (in FIGS. 1(a)-(c), in the X direction) perpendicular to the lengthwise direction (in FIGS. 1(a)-(c), in the Y direction) of the substrate 1, and a surface area (surface area A) was integrated from it. Next, a height threshold value was set so as to select the first raised section 2 and the second raised section 3, and a surface area (surface area B) was integrated. The surface area of the second raised section 3 was calculated by subtracting the surface area A from the surface area B. The surface area of the residual part of the first raised section 2 was calculated by subtracting the surface area A from all the measured surface area (surface area C). A proportion of the surface area of the second raised section 3 to the residual part of the surface area of the first raised section 2 at arbitrary 30 points was calculated according to the following expression (2), and the resultant data were averaged.

$$\text{Surface area of second raised section/surface area of residual part of first raised section} = (\text{surface area } B - \text{surface area } A)/(\text{surface area } C - \text{surface area } A) \quad (2)$$

<Design Properties>

The surface of the raised woodgrain finish decorative material produced in Examples was checked for design properties by visual organoleptic evaluation. 20 panelists evaluated each sample. The samples which the panelist judged to have felt design properties extremely similar to those of actual wood were given a score of 2 points, the samples which the panelist judged to have felt design properties similar to those of actual wood were given a score of 1 point, and the samples which the panelist judged not to have felt design properties similar to those of actual wood were given a score of 0 point. All the scores by the panelists were averaged.

A: Given an average score of 1.5 or more.
B: Given an average score of 1.0 or more and less than 1.5.
C: Given an average score of 0.5 or more and less than 1.0.
D: Given an average score of less than 0.5.

<Feeling>

The surface of the raised woodgrain finish decorative material produced in Examples was checked for the feeling by finger-touch organoleptic evaluation. 20 panelists evaluated each sample. The samples which were judged to have a good raised feeling were given a score of 2 points, the samples which were judged to have a raised feeling were given a score of 1 point, and the samples which were judged to have little raised feeling were given a score of 0 point. All the scores by the panelists were averaged.

A: Given an average score of 1.5 or more.
B: Given an average score of 1.0 or more and less than 1.5.
C: Given an average score of 0.5 or more and less than 1.0.
D: Given an average score of less than 0.5.

TABLE 1

| | Items | | Unit | Example 1-1 | Example 1-2 | Example 1-3 | Example 1-4 | Example 1-5 | Example 1-6 | Example 1-7 | Comparative Example 1-1 |
|---|---|---|---|---|---|---|---|---|---|---|---|
| Measurement | First | height | mm | 0.13 | 0.12 | 0.11 | 0.15 | 0.13 | 0.10 | 0.04 | 0.13 |
| | Raised | width | mm | 1.00 | 1.40 | 0.80 | 1.20 | 0.60 | 0.50 | 0.30 | 1.00 |
| | Section | distance | mm | 2.10 | 5.10 | 4.20 | 1.50 | 1.60 | 2.20 | 3.60 | 2.10 |
| | Second | height | mm | 8.30 | 24.00 | 0.60 | 15.70 | 6.10 | 4.10 | 5.50 | 0.00 |
| | Raised | width | mm | 0.06 | 0.07 | 0.05 | 0.06 | 0.04 | 0.01 | 0.01 | 0.00 |
| | Section | distance | mm | 0.32 | 0.78 | 0.12 | 0.65 | 0.12 | 0.40 | 0.30 | 0.00 |
| | Proportion of second raised section to first raised section | | | 1.10 | 1.70 | 1.60 | 0.80 | 0.70 | 0.20 | 7.50 | 0.00 |
| | Proportion of second raised section to residual part of first raised section | | | 0.40 | 0.60 | 0.50 | 0.30 | 0.30 | 0.08 | 1.10 | 0.00 |
| Evaluation | Design Properties | | | A | A | B | B | B | C | C | D |
| | Feeling | | | A | A | A | B | B | B | C | D |

Example 2-1

A pattern layer-forming coating liquid was applied to a lining substrate 6 having a thickness of 0.20 mm produced according to a calendering method using a polypropylene resin (trade name "Prime Polypro F219DA" from Primer Polymer Corporation) containing a white pigment, and dried to form a pattern layer 4. On the pattern layer 4, a substrate 1 having a thickness of 0.10 mm produced using a polypropylene resin (trade name "Prime Polypro F219DA" from Primer Polymer Corporation) containing a radical scavenger and a UV absorbent was laminated.

Next, the substrate 1 was heated to be softened, and embossed from the side of the substrate 1 to form a first raised section 2, a second raised section 3 and a slope section 10 in the surface of the substrate 1. For the embossing treatment in this step, a laser-embossing plate having a complementary profile to the first raised section 2, the second raised section 3 and the slope section 10 was used to shape the substrate 1 so as to have a raised profile and a slope profile. Thus, the substrate 1 was shaped to have a raised profile and a slope profile, and a raised woodgrain finish decorative material of Example 2-1 was produced.

The height of the first raised section 2 in the raised woodgrain finish decorative material of Example 2-1 was the same as or higher than the height of the top of the slope section 10 in the thickness direction of the substrate 1.

Examples 2-2 to 2-10, Comparative Example 2-1

Raised woodgrain finish decorative materials of Examples 2-2 to 2-10 and Comparative Example 2-1 were produced in the same manner as in Example 2-1 except that the embossing plate for use for embossing treatment was changed.

The height of the first raised section 2 in the raised woodgrain finish decorative materials of Examples 2-2 to 2-10 and Comparative Example 2-1 was the same as or higher than the height of the top of the slope section 10 in the thickness direction of the substrate 1.

[Measurement and Evaluation]

The raised woodgrain finish decorative materials produced in Examples 2-1 to 2-10 and Comparative Example 2-1 were measured and evaluated as follows. The results are shown in Table 2.

<Profile Measurement of First Raised Section and Second Raised Section>

Using a 3D shape measuring device "VR-3000" from Keyence Corporation, the side of the substrate 1 having the first raised section 2, the second raised section 3 and the slope section 10 was photographed, and then analyzed using the accompanying analysis application.

Three portions on the side of the substrate 1 having the first raised section 2, the second raised section 3 and the slope profile 10 were measurement regions (about 24 mm×about 18 mm). A plane (reference plane) to be a base level for the measurement for height data was set, and each parameter was measured.

(1) Height Measurement

At 30 points in 10 portions in the direction (in FIGS. 8(a)-(c), in the X direction) perpendicular to the lengthwise direction (in FIGS. 8(a)-(c), in the Y direction), the first raised section 2 and the second raised section 3 each were analyzed to give a profile curve, and the height of each section was calculated.

(2) Width and Distance Measurement

At 10 points in 3 measurement regions, totaling 30 points, arbitrary width and distance were measured in plane, and from the measurement images by a 3D shape measuring device, width and distance data were calculated and averaged to give average values.

(3) Proportion of Second Raised Section to First Raised Section

First, arbitrary portions in the surface of the substrate 1 were measured using a 3D shape measuring device, and a plane (reference plane) to be a base level for the measurement for height data was set, and the area was measured. A height threshold value was set so as to select the first raised section 2 alone from the profile curve in the direction (in FIGS. 8(a)-(c), in the X direction) perpendicular to the lengthwise direction (in FIGS. 8(a)-(c), in the Y direction) of the substrate 1, and the surface area was integrated from it (surface area A). Next, a height threshold value was set so as to select the first raised section 2 and the second raised section 3, and a surface area (surface area B) was integrated. The surface area of the second raised section 3 was calculated by subtracting the surface area A from the surface area B. A proportion of the surface area of the second raised section 3 to the proportion of the surface area of the first raised section 2 at arbitrary 30 points was calculated according to the following expression (1), and the resultant data were averaged.

Surface area of second raised section/surface area of first raised section=(surface area $B$−surface area $A$)/surface area $A$ (1)

(4) Proportion of Second Raised Section to Residual Part of First Raised Section First, using a 3D shape measuring device, an arbitrary point of the surface of the substrate 1 was measured, and a plane surface (reference surface) to be a standard for measurement of height data was set, and thereafter area measurement was carried out. A height threshold value was set so as to select the first raised section 2 alone from the profile curve in the direction (in FIGS. 8(a)-(c), in the X direction) perpendicular to the lengthwise direction (in FIGS. 8(a)-(c), in the Y direction) of the substrate 1, and a surface area (surface area A) was integrated from it. Next, a height threshold value was set so as to select the first raised section 2 and the second raised section 3, and a surface area (surface area B) was integrated. The surface area of the second raised section 3 was calculated by subtracting the surface area A from the surface area B. The surface area of the residual part of the first raised section 2 was calculated by subtracting the surface area A from all the measured surface area (surface area C). A proportion of the surface area of the second raised section 3 to the residual part of the surface area of the first raised section 2 at arbitrary 30 points was calculated according to the following expression (2), and the resultant data were averaged.

Surface area of second raised section/surface area of residual part of first raised section=(surface area $B$−surface area $A$)/(surface area $C$−surface area $A$) (2)

(5) Inclination Angle

Using a 3D shape measuring device, arbitrary portions in the surface of the substrate 1 were measured to give height data. Next, from the profile curve in the direction (in FIGS. 8(a)-(c), in the X direction) perpendicular to the lengthwise direction (in FIGS. 8(a)-(c), in the Y direction) of the substrate 1, the angle formed by the first raised section 2 and the slope section adjacent thereto was read at arbitrary 30 points, and the data were averaged to give an average value for the inclination angle.

<Design Properties>

The surface of the raised woodgrain finish decorative material produced in Examples and Comparative Example was checked for design properties by visual organoleptic evaluation. 20 panelists evaluated each sample. The samples which the panelist judged to have felt design properties extremely similar to those of actual wood were given a score of 2 points, the samples which the panelist judged to have felt design properties similar to those of actual wood were given a score of 1 point, and the samples which the panelist judged not to have felt design properties similar to those of actual wood were given a score of 0 point. All the scores by the panelists were averaged.

A: Given an average score of 1.5 or more.
B: Given an average score of 1.0 or more and less than 1.5.
C: Given an average score of 0.5 or more and less than 1.0.
D: Given an average score of less than 0.5.

<Feeling>

The surface of the raised woodgrain finish decorative material produced in Examples and Comparative Example was checked for the feeling by finger-touch organoleptic evaluation. 20 panelists evaluated each sample. The samples which were judged to have a raised feeling absolutely without any feeling of strangeness differing from design at all were given a score of 2 points, the samples which were judged to have a raised feeling without any feeling of strangeness differing from design were given a score of 1 point, and the samples which were judged to have little raised feeling but have some feeling of strangeness differing from design were given a score of 0 point. All the scores by the panelists were averaged.

A: Given an average score of 1.5 or more.
B: Given an average score of 1.0 or more and less than 1.5.
C: Given an average score of 0.5 or more and less than 1.0.
D: Given an average score of less than 0.5.

TABLE 2

| | Items | | Unit | Example 2-1 | Example 2-2 | Example 2-3 | Example 2-4 | Example 2-5 | Example 2-6 | Example 2-7 | Example 2-8 | Example 2-9 | Example 2-10 | Comparative Example 2-1 |
|---|---|---|---|---|---|---|---|---|---|---|---|---|---|---|
| Measurement | First Raised Section | height | mm | 0.15 | 0.05 | 0.15 | 0.22 | 0.13 | 0.22 | 0.22 | 0.45 | 0.20 | 0.24 | 0.05 |
| | | width | mm | 0.20 | 0.20 | 0.15 | 0.15 | 0.60 | 1.80 | 3.00 | 0.80 | 3.00 | 4.50 | 0.20 |
| | | distance | mm | 0.60 | 0.80 | 1.20 | 2.00 | 1.60 | 3.00 | 4.00 | 0.20 | 25.00 | 4.50 | 0.50 |
| | Second Raised Section | height | mm | 6.20 | 6.20 | 8.30 | 8.20 | 6.10 | 15.50 | 15.45 | 6.20 | 15.40 | 23.30 | 0.00 |
| | | width | mm | 0.08 | 0.06 | 0.06 | 0.06 | 0.04 | 0.08 | 0.07 | 0.05 | 0.07 | 0.07 | 0.00 |
| | | distance | mm | 0.11 | 0.11 | 0.28 | 0.27 | 0.12 | 0.65 | 0.58 | 0.12 | 0.80 | 0.75 | 0.00 |
| | Slope Section | angle | degree | 14.00 | 3.60 | 7.10 | 6.30 | 4.60 | 4.20 | 3.10 | 66.00 | 4.60 | 3.10 | 0.50 |
| | Proportion of second raised section to first raised section | | | 1.40 | 1.38 | 1.90 | 2.20 | 0.70 | 0.82 | 1.20 | 0.70 | 4.00 | 0.80 | 0.00 |
| | Proportion of second raised section to residual part of first raised section | | | 0.45 | 0.35 | 0.23 | 0.17 | 0.25 | 0.48 | 0.88 | 2.80 | 0.48 | 0.78 | 0.00 |
| Evaluation | Design Properties | | | A | A | A | A | B | B | B | B | B | C | D |
| | Feeling | | | A | A | A | B | B | B | B | C | C | B | D |

INDUSTRIAL APPLICABILITY

The raised woodgrain finish decorative material of the present invention exhibits design properties similar to those of actual wood by the effect of reproducing visual appearance and feeling, and is favorably used as a layer for constituting interior and exterior members of buildings such as a wall, a ceiling, and a floor, and fittings or fixture members such as a window frame, a door, a handrail, a skirting board, a crown molding, and a molding, as well as surface decorative plates for kitchen, furniture, or cabinets of light electrical appliances and OA instruments, and interior and exterior members of vehicles.

REFERENCE SIGNS LIST

1 Substrate
2 First Raised Section
3 Second Raised Section
4 Pattern Layer
5 Lining Substrate
10 Slope Section

The invention claimed is:

1. A raised woodgrain finish decorative material comprising:
a substrate,
a first raised section provided on one surface of the substrate,
a slope section provided on the one surface of the substrate in a different location than the location of the first raised section in a planar view, and
a second raised section provided on the one surface of the substrate in at least any of a different location than the location of the first raised section and a location of the slope section, wherein:
the height of the first raised section is the same as or higher than the height of the top of the slope section in the thickness direction of the substrate, and
the height of the first raised section is higher than the height of the second raised section in the thickness direction of the substrate;
wherein the inclination angle of the slope section is 3 degrees or more and 70 degrees or less based on the substrate surface on which the slope section is provided.

2. The raised woodgrain finish decorative material according to claim 1, wherein the slope section extends from the neighboring one first raised section to the neighboring other first raised section.

3. The raised woodgrain finish decorative material according to claim 1, wherein the height of the first raised section is 0.050 mm or more and 0.500 mm or less from the substrate surface.

4. The raised woodgrain finish decorative material according to claim 1, wherein the width of the first raised section is 0.20 mm or more and 5.00 mm or less in the direction perpendicular to the lengthwise direction of the substrate.

5. The raised woodgrain finish decorative material according to claim 1, wherein the distance between the first raised sections in the direction perpendicular to the lengthwise direction of the substrate is 0.20 mm or more and 30.00 or less.

6. The raised woodgrain finish decorative material according to claim 1, wherein the end of the first raised section exists only at the edge of the substrate.

7. The raised woodgrain finish decorative material according to claim 1, wherein the length of first raised section is longer than that of the second raised section in the lengthwise direction of the substrate.

8. The raised woodgrain finish decorative material according to claim 1, wherein the length of the second raised section is 0.30 mm or more and 300.00 mm or less in the lengthwise direction of the substrate.

9. The raised woodgrain finish decorative material according to claim 1, wherein the height of the second raised section is 0.02 mm or more and 0.10 mm or less from the substrate surface or the slope section surface.

10. The raised woodgrain finish decorative material according to claim 1, wherein the width of the second raised section is 0.06 mm or more and 0.90 mm or less in the direction perpendicular to the lengthwise direction of the substrate.

11. The raised woodgrain finish decorative material according to claim 1, wherein the proportion of the second raised section to the proportion of the first raised section in the substrate surface is 0.50 or more and 4.00 or less.

12. The raised woodgrain finish decorative material according to claim 1, wherein the proportion of the second raised section to the residual part of the first raised section in the substrate surface is 0.10 or more and 3.00 or less.

13. The raised woodgrain finish decorative material according to claim 1, wherein the end of the second raised section in the lengthwise direction of the substrate has a narrowed and roundish form.

14. The raised woodgrain finish decorative material according to claim 1, wherein the second raised sections are aligned in series at intervals in the lengthwise direction of the substrate.

15. The raised woodgrain finish decorative material according to claim 1, further having a pattern layer on the surface of at least one side of the substrate.

16. The raised woodgrain finish decorative material according to claim 1, further having a lining substrate on the opposite side surface to the surface on which the first raised section and the second raised section are provided.

17. A raised woodgrain finish decorative material comprising:
a substrate,
a first raised section provided on one surface of the substrate,
a slope section provided on the one surface of the substrate in a different location than the location of the first raised section in a planar view, and
a second raised section provided on the one surface of the substrate in at least any of a different location than the location of the first raised section and a location of the slope section, wherein:
the height of the first raised section is the same as or higher than the height of the top of the slope section in the thickness direction of the substrate, and
the height of the first raised section is higher than the height of the second raised section in the thickness direction of the substrate;
wherein the second raised sections are aligned in series at intervals in the lengthwise direction of the substrate, without via the first raised section.

* * * * *